US011518877B2

(12) United States Patent
Ozcan et al.

(10) Patent No.: US 11,518,877 B2
(45) Date of Patent: Dec. 6, 2022

(54) TOUGHENED POLYESTER COMPOSITES CONTAINING POLYESTER MATRIX AND DROPLETS OF HIGH BOILING LIQUID THEREIN

(71) Applicant: UT-Battelle, LLC, Oak Ridge, TN (US)

(72) Inventors: Soydan Ozcan, Oak Ridge, TN (US); Kai Li, Oak Ridge, TN (US); Yu Wang, Chengdu (CN); Halil L. Tekinalp, Knoxville, TN (US)

(73) Assignees: UT-Battelle, LLC, Oak Ridge, TN (US); University of Tennessee Research Foundation, Knoxville, TN (US)

( * ) Notice: Subject to any disclaimer, the term of this patent is extended or adjusted under 35 U.S.C. 154(b) by 217 days.

(21) Appl. No.: 16/775,827

(22) Filed: Jan. 29, 2020

(65) Prior Publication Data

US 2020/0354566 A1    Nov. 12, 2020

Related U.S. Application Data

(60) Provisional application No. 62/844,153, filed on May 7, 2019.

(51) Int. Cl.
| | |
|---|---|
| *C08G 77/26* | (2006.01) |
| *C08L 67/02* | (2006.01) |
| *C08L 83/04* | (2006.01) |
| *C08G 63/08* | (2006.01) |
| *C08G 63/88* | (2006.01) |
| *C08J 3/09* | (2006.01) |
| *C08K 5/092* | (2006.01) |
| *C08G 77/04* | (2006.01) |
| *C08G 77/12* | (2006.01) |

(52) U.S. Cl.
CPC ............. *C08L 67/02* (2013.01); *C08G 63/08* (2013.01); *C08G 63/88* (2013.01); *C08G 77/04* (2013.01); *C08J 3/098* (2013.01); *C08K 5/092* (2013.01); *C08L 83/04* (2013.01); *C08G 77/12* (2013.01); *C08G 77/26* (2013.01); *C08J 2483/04* (2013.01)

(58) Field of Classification Search
CPC .......... C06L 67/02; C06L 67/03; C06L 67/04; C08G 63/08; C08G 77/26; C08L 83/04; C08K 5/092; C08K 5/17; C08K 5/05
See application file for complete search history.

(56) References Cited

U.S. PATENT DOCUMENTS

2017/0121860 A1* 5/2017 Dahringer .............. D04H 1/435
2019/0062495 A1 2/2019 Meng et al.

OTHER PUBLICATIONS

Gelest (https://www.gelest.com/product/SIT7089.0/)(date unknown).*
Meng, X. et al., "Supertough PLA-Silane Nanohybrids by in Situ Condensation and Grafting", ACS Sustainable Chemistry & Engineering, vol. 6, pp. 1289-1298 (2018).

* cited by examiner

*Primary Examiner* — Kuo Liang Peng
(74) *Attorney, Agent, or Firm* — Scully, Scott, Murphy & Presser, P.C.

(57) ABSTRACT

A toughened polyester composite comprising: (i) a polyester matrix and (ii) droplets of a high boiling point liquid having a boiling point of at least 140° C. dispersed in said polyester matrix, wherein the high boiling point liquid is present in an amount of 0.1-10 wt % by weight of the toughened polyester composite, and wherein the composite may further include: (iii) a modifier selected from polycarboxylic, polyol, and polyamine compounds, wherein the modifier is present in an amount of 0.1-10 wt % by weight of the toughened polyester composite. Methods for producing the polyester composite are also described.

24 Claims, 18 Drawing Sheets

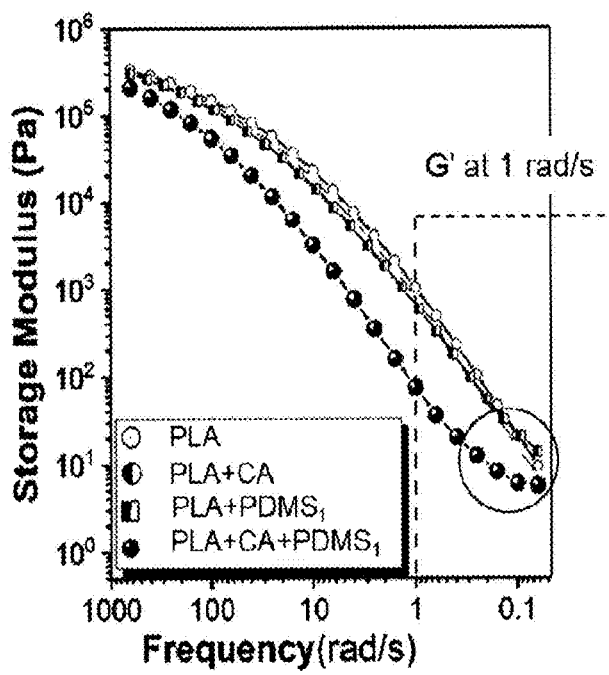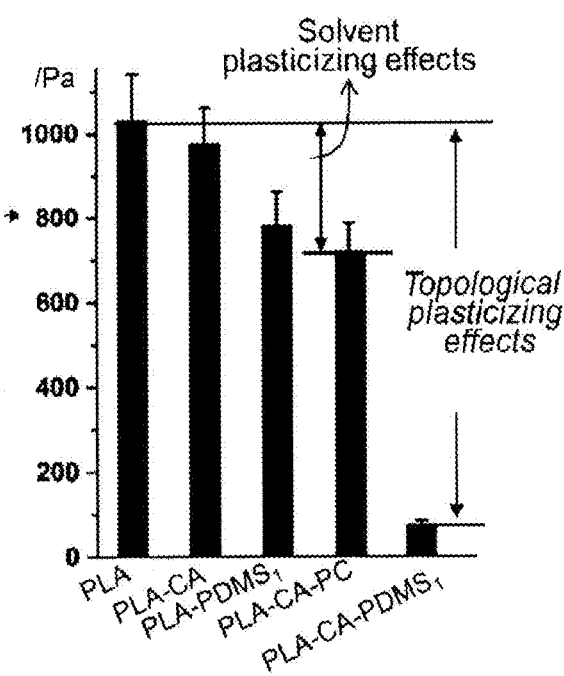
FIG. 7A    FIG. 7B
FIGS. 7A-7B

TOUGHENED POLYESTER COMPOSITES CONTAINING POLYESTER MATRIX AND DROPLETS OF HIGH BOILING LIQUID THEREIN

CROSS REFERENCE TO RELATED APPLICATION

The present application claims benefit of U.S. Provisional Application No. 62/844,153, filed on May 7, 2019, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE INVENTION

The present invention relates generally to polymer composites, and more particularly, to polyester composites containing droplets of a liquid, particularly high boiling point liquids, dispersed in a polyester matrix, such as PLA or PLGA.

BACKGROUND OF THE INVENTION

Poly(lactic acid) (PLA), which is commonly made from renewable resources, is a high strength (~60 MPa), high modulus thermoplastic polyester that was first discovered in 1932 by Carothers (DuPont). Such features as good biodegradability and biocompatibility, and acceptable strength, stiffness, and processability have made PLA and copolymers thereof (e.g., PLGA) some of the most promising biopolymers with the potential to replace petroleum-based polymers. Due to these unique properties, PLA has already been applied to packaging and surgical implants. However, broader applications and larger scale demand of PLA as a commodity thermoplastic have been limited by several major drawbacks. Among them, intrinsic brittleness that originates from semi-rigid chains is one of the major barriers to durable applications. Other drawbacks, such as poor melt strength, restrict its use in such areas as 3D printing, film blowing, and foaming.

Almost since its first discovery, much research has been devoted to developing tougher and more ductile PLA materials, and a remarkable surge in this effort has been witnessed in the past decade in accordance with an increasing effort in finding bioplastic alternatives to petroleum-based polymers. Various strategies have been employed to improve the toughness and ductility of PLA, including adding small molecular plasticizers, blending with other ductile polymers, copolymerization, and nanocomposites. These approaches have, indeed, resulted in PLA and PLGA materials with increased ductility and toughness. However, in most cases, strengths and moduli (e.g. tensile) decreased dramatically in adverse compensation for the improvement in ductility. For example, epoxidized soybean oil has been used as a plasticizer to increase the elongation to break of PLA by 63%, but with a decrease in tensile strength and modulus by 27% and 23%, respectively (Y. Q. Xu, et al., *Journal of Applied Polymer Science*, 112(6) (2009) 3185-3191).

As is well known, toughening typically involves processes of stress yielding, craze formation, or a combination of both (e.g., M. Harada et al., *Journal of Applied Polymer Science* 106(3) (2007) 1813-1820. Addition of a plasticizer or another "soft" polymer facilitates chain segmental motion and chain sliding, and lowers the stress requirement for both of the above processes. As a result, a decrease in glass transition temperature ($T_g$), tensile strength, and modulus is often observed. Moreover, the additives are often not compatible with the PLA matrix, thus leading to separated phases and weak interfaces, which further lower the strength. In view of the above, there would be a particular benefit in PLA and other polyester compositions that depart from the conventional compositions of the art by having superior toughness, as exhibited by substantial ductility along with substantial strength and modulus.

SUMMARY OF THE INVENTION

The present invention is foremost directed to toughened polyester composites containing a polyester matrix and droplets of a high boiling liquid dispersed in the polyester matrix. In more specific embodiments, the toughened polyester composites contain: (i) a polyester matrix and (ii) droplets of a high boiling point liquid having a boiling point of at least 140° C. dispersed in said polyester matrix, wherein the high boiling point liquid is present in an amount of 0.1-10 wt % by weight of the toughened polyester composite. In further embodiments, the polyester composite further includes a modifier that is either a polycarboxylic, polyol, or polyamine compound, wherein the modifier is present in an amount of 0.1-10 wt % by weight of the toughened polyester composite.

Described herein is a new class of topological supertough polymer-droplet composites (PDCs) for mechanical energy absorption and dissipation. The new PDCs are realized through a mussel-byssus-inspired topology reconstruction strategy incorporating droplets of a high boiling point liquid into a polyester matrix, and optionally, further incorporating a chain end/tail marker as a topological modifier. Using the described method, extremely brittle poly(lactic acid) can be successfully transformed into a supertough bioplastic with toughness improved by up to, at least, or even over 2,000% via a minimal amount of topological modifiers (1.5 wt %). Moreover, the composites exhibit unexpected strain rate speed-enhanced energy absorption capability. A hierarchical topological super-toughening mechanism is further proposed to explain the PDC's unusual properties. This work also highlights the promise of customizable droplets as a powerful tool for designing novel polymer composites with advanced mechanical properties and functions.

The polyester composites described herein advantageously exhibit a combination of exceptional ductility and toughness. Thus, by this invention, a range of polyesters, including bioplastics, such as PLA, that have heretofore been substantially limited in their use can now be directed to a broader range of applications, including more critical or rugged applications that have traditionally been better suited to petroleum-based polymers.

BRIEF DESCRIPTION OF THE FIGURES

FIG. 7A is a storage modulus vs. frequency plot of the PLA+CA+PDMS$_1$ PDCs, and FIG. 7B shows the corresponding storage modulus plot.

DETAILED DESCRIPTION OF THE INVENTION

Figure 1:
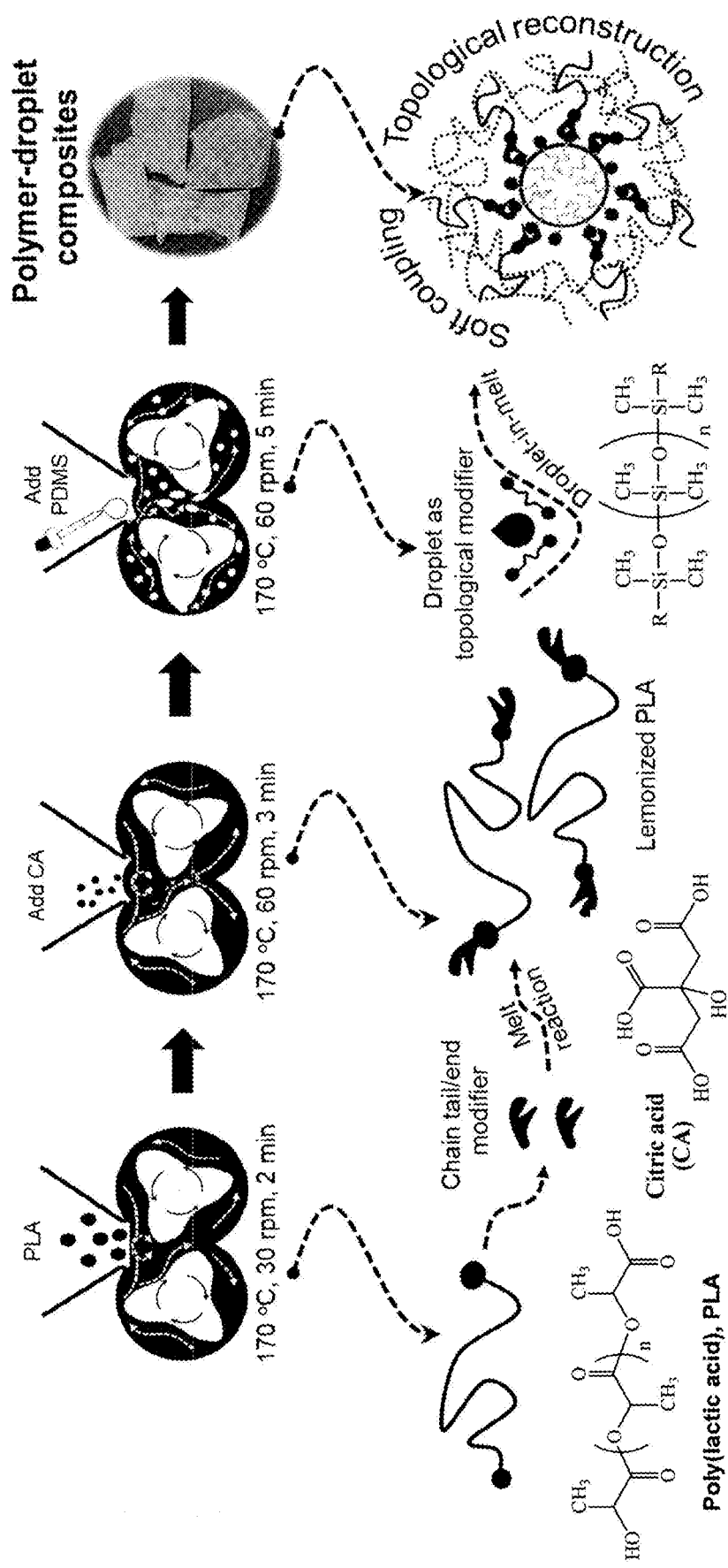
FIG. 1 schematically depicts an exemplary melt-based fabrication process for producing the polymer-droplet composites (PDCs) described herein, wherein the PDC contains PLA with 0.5 wt % CA and 1 wt % of PDMS-NH$_2$ (i.e., PLA-CA/1-PDMS-NH$_2$), also referred to herein as PLA+CA+PDMS$_1$.

The polyester composites described herein contain, as a first component (i.e., "component (i)"), one or more polyester polymers (also referred to herein as "polyesters"), which serve as a matrix for droplets of a high boiling point liquid. The polyester polymer (matrix) considered herein can be any polymer containing ester (—C(O)O—) linkages at least in a backbone of the polymer. The polyester polymer may or may not also have ester groups in pendant portions or terminal positions of the polymer. The polyester polymer can have any of a variety of possible number-average or weight-average molecular weights ($M_n$ or $M_w$, respectively). In different embodiments, the polyester polymer has a molecular weight of about, at least, greater than, up to, or less than, for example, 1,000 g/mol, 2,000 g/mol, 5,000 g/mol, 10,000 g/mol, 20,000 g/mol, 30,000 g/mol, 40,000 g/mol, 50,000 g/mol, 75,000 g/mol, 100,000 g/mol, 150,000 g/mol, 200,000 g/mol, 300,000 g/mol, 500,000 g/mol, or 1,000,000 g/mol, or a molecular weight within a range bounded by any two of the foregoing exemplary values.

In some embodiments, the polyester is a polyhydroxyalkanoate, which corresponds to the following generic structure:

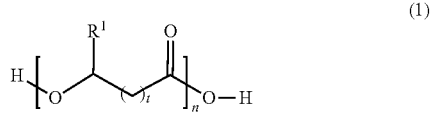

In Formula (1), $R^1$ is selected from a hydrogen atom (H) or hydrocarbon group (R). The hydrocarbon group (R) can be any saturated or unsaturated hydrocarbon group, typically containing 1, 2, 3, 4, 5, 6, 7, 8, 9, 10, 11, or 12 carbon atoms or a number of carbon atoms within a range bounded by any two of the foregoing values (e.g., 1-12, 2-12, 3-12, 1-6, 1-4, or 1-3 carbon atoms). The hydrocarbon group (R) may be, for example, a straight-chained (linear) or branched alkyl or alkenyl group, or saturated or unsaturated cyclic hydrocarbon group. In some embodiments, the hydrocarbon group (R) is an alkyl group having one, two, three, four, five, or six carbon atoms, such as a methyl, ethyl, n-propyl, isopropyl, n-butyl, sec-butyl, n-pentyl, isopentyl, cyclopentyl, n-hexyl, isohexyl, or cyclohexyl group. The hydrocarbon group may, in some cases, be an unsaturated ring, such as a phenyl group. The hydrocarbon group may also be composed solely of carbon and hydrogen atoms, or may contain one or more heteroatoms selected from oxygen, nitrogen, and halogen atoms. Thus, in the case of cyclic hydrocarbon groups, the cyclic group may be a carbocyclic group or a heterocyclic group. The variable t is typically an integer from 0 to 4. The subscript t is more typically an integer from 0 to 3 (i.e., t is typically 0, 1, 2, or 3). The variable n is typically an integer of at least 10. In different embodiments, the subscript n is an integer of at least or greater than 10, 20, 50, 100, 200, 500, 1000, 1500, 2000, 2500, or 5000, or a value within a range bounded therein, or n can be a value that results in any of the exemplary molecular weights provided above.

When t is 0, Formula (1) depicts a polymer of an alpha-hydroxy (α-hydroxy) acid. An example of an α-hydroxy polymer when $R^1$ in Formula (1) is H is polyglycolic acid. An example of an α-hydroxy polymer when $R^1$ is methyl is polylactic acid (i.e., PLA, polymer of 2-hydroxypropionic acid, also known as poly-L-lactic acid, poly-D-lactic acid, or poly-DL-lactic acid). An example of an α-hydroxy polymer when $R^1$ is phenyl is polymandelic acid. When t is 1, Formula (1) depicts a polymer of a beta-hydroxy (β-hydroxy) acid. An example of a β-hydroxy polymer when $R^1$ is H is poly(3-hydroxypropionic acid). An example of a β-hydroxy polymer when $R^1$ is methyl is poly(3-hydroxybutyric acid) (i.e., P3HB). An example of a β-hydroxy polymer when $R^1$ is ethyl is poly(3-hydroxyvaleric acid) (i.e., PHV). An example of a β-hydroxy polymer when $R^1$ is n-propyl is poly(3-hydroxyhexanoic acid) (i.e., PHH). When t is 2, Formula (1) depicts a polymer of a gamma-hydroxy (γ-hydroxy) acid. An example of a γ-hydroxy polymer when R¹ is H is poly(4-hydroxybutyric acid) (i.e., P4HB). An example of a γ-hydroxy polymer when R¹ is methyl is poly(4-hydroxyvaleric acid). Some examples of polyhydroxyalkanoates with t=3 include poly(5-hydroxyvaleric acid) and poly(5-hydroxyhexanoic acid). An example of a polyhydroxyalkanoate with t=4 includes poly(6-hydroxyhexanoic acid), also known as polycaprolactone (PCL). In some cases, the polyhydroxyalkanoate may be selected from poly(hydroxypropionic acid)s, poly(hydroxybutyric acid)s, poly(hydroxyvaleric acid)s, or poly(hydroxyhexanoic acid)s. The hydroxy acid need not be within the scope of Formula (1) to be suitable. For example, a polymer of salicylic acid may or may not also be considered.

Copolymers of the hydroxy acids are also considered herein. In some embodiments, two or more different types of hydroxyalkanoates are in the copolymer, such as in (poly(lactic-co-glycolic acid, i.e., PLGA), poly(3-hydroxybutyrate-co-3-hydroxyvalerate) (i.e., PHBV), or poly(3-hydroxybutyrate-co-3-hydroxyhexanoate). In other embodiments, the copolymer includes one or more non-hydroxyalkanoate portions, as in poly(glycolide-co-trimethylene carbonate) and poly(lactide-co-polyethylene glycol).

In some embodiments, the polyester is a diol-diacid type of polyester, i.e., a polyester resulting from the condensation of a diol with a diacid. The diol-diacid types of polyesters can be defined by the following generic structure:

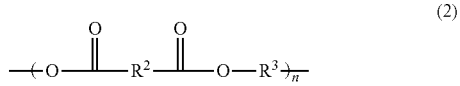

(2)

In the above Formula (2), R² and R³ are independently selected from hydrocarbon linking groups, which can be derived from hydrocarbon groups (R) containing 1-12 carbon atoms, as defined above, by replacing another hydrogen atom of the hydrocarbon group with a bond. For example, a methyl (—CH₃) group, selected from R groups, can have a hydrogen atom removed to result in a methylene (—CH₂—) linking group corresponding to R² and/or R³. The variable n is as described above. In some embodiments, one or both (or at least one) of the linking groups R² and R³ are independently selected from alkylene groups, i.e., linking groups of the formula —(CH₂)ₘ—, where m is typically 1-12. In other embodiments, one or both (or at least one) of the linking groups R² and R³ are independently selected from saturated or unsaturated carbocyclic or heterocyclic groups (e.g., cyclopentyl, cyclohexyl, phenylene, and furan groups). In a first set of particular embodiments, R² is phenylene and R³ is an alkylene group, in which case the polyester can be generally classified as a polyalkylene terephthalate. In the case where R² is phenylene and R³ is methylene (—CH₂—), the polyester is a polymethylene terephthalate (PMT); in the case where R² is phenylene and R³ is ethylene (—CH₂CH₂—), the polyester is a polyethylene terephthalate (PET); in the case where R² is phenylene and R³ is propylene (—CH₂CH₂CH₂—), the polyester is a polypropylene terephthalate (PPT); in the case where R² is phenylene and R³ is butylene (—CH₂CH₂CH₂CH₂—), the polyester is a polybutylene terephthalate (PBT). In a second set of particular embodiments, R² and R³ are independently selected from alkylene groups. In the particular case where R² is ethylene, the polyester of Formula (2) is herein referred to as a succinate-based polyester, e.g., a polyethylene succinate, when R³ is also ethylene; or a polypropylene succinate, when R³ is propylene; or a polybutylene succinate, when R³ is butylene. In the particular case where R² is butylene, the polyester of Formula (2) is herein referred to as an adipate-based polyester, e.g., a polyethylene adipate, when R³ is ethylene; or a polypropylene adipate, when R³ is propylene; or a polybutylene adipate, when R³ is also butylene. In some embodiments, R² in Formula (2) may be a bond, which results in oxalate-based polyesters, such as polyethylene oxalates, when R³ is ethylene. Other less common or more specialized polyesters according to Formula (2) are considered herein, such as when R² is naphthyl, which corresponds to the naphthalate-based polyesters, such as polyethylene naphthalate (PEN), when R³ is ethylene, or polybutylene naphthalate (PBN), when R³ is butylene.

The polyester may alternatively be any of the vinyl ester and unsaturated polyester resins well known in the art. Vinyl ester resins are described, for example, in S. Jaswal et al., Reviews in Chemical Engineering, 30(6), 567-581 (2014); H. M. Kang et al., Journal of Applied Polymer Science, 79:1042-1053 (2001); and M. A. F. Robertson et al., J. Adhesion, 71:395-416 (1999), the contents of which are herein incorporated by reference in their entirety. Unsaturated polyester resins are described in, for example, H. Yang et al., Applied Polymer, 79(7), 1230-1242, 2001; M. Malik et al., J. Macromol. Sci. Rev. Macromol. Chem. Phys., C40(2&3), 139-165 (2000); and M. Olesky et al., Ind. Eng. Chem. Res., 52(20), 6713-6721 (2013), the contents of which are herein incorporated by reference in their entirety.

The toughened polyester composite also contains, as a second component (i.e., "component (ii)") droplets of a high boiling point liquid having a boiling point of at least 140° C. dispersed in the polyester matrix. The term "dispersed," as used herein, indicates that each droplet is surrounded by the polyester matrix. For purposes of the invention, the high boiling point liquid should have poor compatibility with or be substantially or completely incompatible with the polyester matrix. That is, the high boiling point liquid should be completely insoluble in (i.e., immiscible with) the polyester matrix. In different embodiments, the high boiling point liquid has a boiling point of precisely, at least, or above, for example, 140° C., 145° C., 150° C., 155° C., 160° C., 170° C., 180° C., 190° C., 200° C., 210° C., 220° C., 230° C., 240° C., or 250° C., or a boiling point within a range bounded by any two of the foregoing values (e.g., 140-250° C., 145-250° C., 150-250° C., or 160-250° C.). The high boiling point liquid is typically a liquid at a temperature of 20° C., 25° C., or 30° C., in addition to being a liquid at higher temperatures. Thus, the melting point of the high boiling point liquid is generally up to or below 0° C., 10° C., 15° C., 20° C., 25° C., or 30° C. The term "liquid," as used herein, generally refers to a viscosity of up to or less than 100,000 cP, or in some embodiments, up to or less than 75,000, 50,000, 25,000, 15,000, 10,000, 5,000, 2,000, 1,000, 500, 200, 100, or 50 cP (or the same number in cSt, or up to or less than a viscosity in the range of 0.1-100 Pa·s).

The high boiling point liquid is typically present in the polyester composite in an amount of 0.1-10 wt % by weight of the toughened polyester composite. In different embodiments, the high boiling point liquid is present in the polyester composite in an amount of, for example, 0.1, 0.2, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10.0 wt %, or an amount within a range bounded by any two of the foregoing values (e.g., 0.5-10 wt %, 1-10 wt %, 0.5-8 wt %, 1-8 wt %, 0.5-6 wt %, 1-6 wt %, 0.5-5 wt %, 1-5 wt %, 0.1-2 wt %, 0.5-2 wt %, 0.1-1.5 wt %, or 0.1-1 wt %).

The droplets of high boiling point liquid typically have a size of at least 50 nm and up to 50 microns, 75 microns, or 100 microns. In different embodiments, the droplets have a size of about 50 nm, 75 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, 1000 nm (1 micron), 2 microns, 5 microns, 10 microns, 20 microns, 50 microns, 100 microns, 150 microns, 200 microns, or 500 microns, or a size within a range bounded by any two of the foregoing values (e.g., 50 nm-50 microns, 50 nm-2 microns, 50 nm-1 micron, 100 nm-50 microns, 100 nm-2 microns, 100 nm-1 micron, 200 nm-50 microns, 200 nm-2 microns, or 200 nm-1 micron). In some embodiments, a portion or all of the droplets may have a size less than 50 nm (e.g., 20, 30, or 40 nm). In other embodiments, the droplets have a size exclusively within a specified size range, such as any of the exemplified or otherwise possible size ranges provided above. In yet other embodiments, at least 70%, 80%, 85%, 90%, or 95% of the droplets are within any of the exemplified or otherwise possible size ranges provided above. The droplets may also, in some embodiments, be substantially uniform in size, such as at least 90%, 95%, 98%, or 99% of the droplets having a size within a range of 400 nm-1 micron, 500-800 nm, 600-800 nm, or 650-750 nm, or within any of the exemplified or otherwise possible size ranges provided above.

In one set of embodiments, the high boiling point liquid is or includes a high-boiling plant-derived oil, animal-derived oil, or mineral oil. Some examples of high-boiling plant-derived oils include corn oil, soy oil, canola oil, olive oil, cottonseed oil, avocado oil, rice bran oil, rapeseed oil, peanut oil, sunflower oil, safflower oil, grape seed oil, linseed oil, and sesame oil. The oil may also be an isolated fraction of a plant or animal oil, such as LLL, LLO, LLP, OOL, or PLO triacylglycerol molecules found in corn oil, wherein L=linoleic acid (i.e., linoleoyl), O=oleic acid (i.e., oleoyl), and P=palmitic acid (i.e., palmitolyl). The oil may also be or contain an unnatural triacylglycerol. The oil may also be composed of acyl groups attached to a polyol backbone other than glycerol (e.g., sucrose backbone, as found in the fat substitute Olestra®). As indicated above, the high boiling point oil may also be or include mineral oil. As well known in the art, mineral oil is typically composed of a mixture of higher alkanes (i.e., paraffins) and some cyclic saturated and aromatic hydrocarbons.

In another set of embodiments, the high boiling point liquid is a polysiloxane. The polysiloxane can be expressed by the following formula:

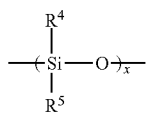

(3)

In Formula (3), $R^4$ and $R^5$ are independently selected from any of the hydrocarbon groups (R) described above. In different embodiments, $R^4$ and $R^5$ are independently selected from hydrogen atom, linear or branched alkyl or alkenyl groups containing 1-12 carbon atoms, and cyclic saturated or unsaturated hydrocarbon groups, such as any of the groups already described above. The variable x is typically at least or greater than 2, 3, 4, or 5. The variable x may be at least or greater than, for example, 2, 3, 4, 5, 6, 7, 8, 9, 10, 12, 15, 18, 20, 30, 40, 50, 80, 100, 120, 150, 180, 200, 250, 300, 350, 400, 450, 500, 1000, 2000, 5000, 8,000, 10,000, 15,000, or 20,000, or a value within a range bounded by any two of the foregoing values. Notably, for purposes of the invention, $R^4$, $R^5$, and x are selected so that, together, they result in a liquid polysiloxane having a boiling point of at least 140° C., 150° C., or 160° C. One or both of $R^4$ and $R^5$ may also be siloxy (i.e., —O—SiR$_3$) groups, provided the polysiloxane remains a liquid and has a boiling point of at least 140° C., 150° C., or 160° C. Thus, the polysiloxane may be linear or branched. The polysiloxane necessarily also possesses two terminal ends, which may be occupied by, for example, ether (e.g., methoxy or trimethylsiloxy) groups, in which case the polysiloxane is considered unfunctionalized. Alternatively, one or both terminal ends of the polysiloxane may or may not be occupied by functional groups, such as one or more selected from hydroxy, amine, carboxylic acid, thiol, diglycidyl ether, acrylamide, vinyl, and halogen groups. In particular embodiments, the polysiloxane is terminal-functionalized with amine (—NH$_2$) groups. The polysiloxane may or may not also or alternatively contain any of the foregoing functional groups at non-terminal positions. The polysiloxane may also be fluorinated by containing one or more fluorine atoms.

In particular embodiments, the polysiloxane is, or alternatively includes a block of, a polydimethylsiloxane (PDMS) or polymethylhydrosiloxane (PMHS), both of which are well known in the art. In PDMS, $R^4$ and $R^5$ in Formula (3) are both methyl. In PMHS, at least one of $R^4$ and $R^5$ in Formula (3) is a hydrogen atom for at least a portion of the polymer units. The PDMS or PMHS can have any of the functional groups described above, which may be at one or both terminal positions. Some examples of shorter length PDMS polymers (e.g., where x is 2, 3, or 4) include octamethyltrisiloxane (b.p. of about 153° C.) and hexaethyldisiloxane (b.p. of about 234° C.). In different particular embodiments, the PDMS or PMHS may be fluorinated (e.g., poly(3,3,3-trifluoropropylmethylsiloxane, nonafluorohexylmethylsiloxane, or tridecafluorooctylmethylsiloxane, typically as copolymers with dimethylsiloxane units), or may contain phenyl groups (e.g., phenylmethylsiloxane-dimethylsiloxane copolymer), or may contain longer chain alkyl groups than methyl (e.g., ethyl, propyl, butyl, pentyl, hexyl, heptyl, octyl, octadecyl, triacontyl, e.g., polydiethylsiloxanes and octadecylmethylsiloxane-dimethylsiloxane copolymer). The PDMS or PMHS may also be a hydrophilic silicone, such as a polyalkylene oxide silicone, e.g., dimethylsiloxane-ethylene oxide block/graft copolymers. The PDMS or PMHS may also be polar, such as (N-pyrrolidonepropyl)-methylsiloxane-dimethylsiloxane copolymer, polytetrahydrofurfuryloxypropylmethylsiloxane, or polycyanopropylmethylsiloxane.

For any of the polysiloxanes described above, including PDMS and PMHS, the molecular weight can be essentially any value, provided the polysiloxane is a liquid, as discussed above, and has a boiling point of at least 140° C., 150° C., or 160° C. For example, the polysiloxane may have a molecular weight within a range of 162 to 500,000, which, for PDMS, corresponds to viscosities of 0.65 to 20,000,000 cSt (or approximately the same value of cP), respectively, across the range of molecular weights. More typically, the polysiloxane has a molecular weight corresponding to 162 to 139,000, which generally corresponds to viscosities of 0.65 to 100,000 cSt. In different embodiments, the polysiloxane has a number-average or weight-average molecular weight of at precisely, about, at least, or above, for example, 150, 200, 300, 400, 500, 1000, 2000, 5000, 10,000, 20,000, 50,000, 100,000, 150,000, 200,000, or 250,000 g/mol, or a molecular weight or range of molecular weights within a range bounded by any two of the foregoing values.

The polyester composite may further include a modifier compound selected from polycarboxylic, polyol, and polyamine compounds. In some embodiments, the polycarboxylic, polyol, or polyamine modifier compound contains solely carboxylic acid, hydroxy, or amine functional groups, while, in other embodiments, the foregoing modifier compounds contain two or more such functional groups (e.g., carboxylic acid and hydroxy or amine, or amine and hydroxy). The modifier may be referred to as "component (iii)". In the polyester composite, depending on the preparation conditions and selection of components (i) and (ii), the modifier may be present without being covalently bonded to any of components (i) or (ii) or may alternatively be covalently bonded to component (i) and/or (ii).

In a first set of embodiments, the modifier is or includes a polycarboxylic acid. The polycarboxylic acid modifier may be, for example, a dicarboxylic acid, tricarboxylic acid, tetracarboxylic acid, or higher polycarboxylic acid. Some examples of dicarboxylic acids include oxalic acid, malonic acid, succinic acid, fumaric acid, maleic acid, glutaric acid, adipic acid, pimelic acid, diaminopimelic acid, tartaric acid, glutamic acid, aspartic acid, malic acid, itaconic acid, oxaloacetic acid, phthalic acid, isophthalic acid, terephthalic acid, and diphenic acid. Some examples of tricarboxylic acids include citric acid, isocitric acid, aconitic acid, propane-1,2,3-tricarboxylic acid, trimesic acid, trimellitic acid, nitrilotriacetic acid, and 1,3,5-triazine-2,4,6-tricarboxylic acid. Some examples of tetracarboxylic acids include 1,2,3,4-butanetetracarboxylic acid, 2,2'-oxydisuccinic acid, biphenyl-3,3',5,5'-tetracarboxylic acid, ethylenediaminetetraacetic acid, and furantetracarboxylic acid. Some examples of higher polycarboxylic acids include mellitic acid and cyclohexane-1,2,3,4,5,6-hexacarboxylic acid, each of which contains six carboxylic acid groups.

In a second set of embodiments, the modifier is or includes a polyol. The polyol modifier may be, for example, a diol, triol, tetrol, or higher polyol. Some examples of diols include ethylene glycol, 1,2-propanediol, 1,3-propanediol, 1,4-butanediol, diethylene glycol, triethylene glycol, tetraethylene glycol, pentaethylene glycol, polyethylene glycol (typically at least 10 ethyleneoxy units), diethanolamine, catechol, resorcinol, and hydroquinone. Some examples of triols include glycerol, 1,2,4-butanetriol, 1,2,3-butanetriol, triethanolamine, hydroxyquinol, phloroglucinol, gallic acid, and pyrogallol. Some examples of tetrols include erythritol, pentaerythritol, and N,N,N',N'-tetrakis(2-hydroxyethyl)ethylenediamine. Some examples of higher polyols include many of the sugar alcohols, e.g., sorbitol, xylitol, maltitol, isomalt, and lactitol.

In a third set of embodiments, the modifier is or includes a polyamine, wherein the polyamine typically contains at least two primary amine ($NH_2$) and/or secondary amine groups. The amine modifier may be, for example, a diamine, triamine, tetramine, or higher polyamine. Some examples of diamines include ethylenediamine, 1,3-diaminopropane, 1,2-diaminopropane, 1,4-diaminobutane, 1,5-diaminopentane, o-, m-, or p-xylylenediamine, o-, m-, or p-phenylenediamine, 1,4-diazacycloheptane, 1,2-diaminocyclohexane, and lysine. Some examples of triamines include diethylenetriamine, 1,2,3-triaminopropane, spermidine, and 1,3,5-triaminobenzene. Some examples of tetramines include triethylenetetramine, 1,2,3,4-butanetetramine, spermine, and 1,2,4,5-benzenetetramine. Some examples of higher polyamines include polyethyleneimine and polyvinylamine.

The modifier is typically present in an amount of 0.1-10 wt % by weight of the toughened polyester composite. In different embodiments, the modifier is present in the polyester composite in an amount of, for example, 0.1, 0.2, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10.0 wt %, or an amount within a range bounded by any two of the foregoing values (e.g., 0.5-10 wt %, 1-10 wt %, 0.5-8 wt %, 1-8 wt %, 0.5-6 wt %, 1-6 wt %, 0.5-5 wt %, 1-5 wt %, 0.1-2 wt %, 0.5-2 wt %, 0.1-1.5 wt %, or 0.1-1 wt %).

The polyester composite may or may not also include filler particles. Some examples of filler particles include cellulosic particles (e.g., cellulose nanoparticles or nanofibrils) and metal oxide particles (e.g., beads), wherein the metal oxide may be, for example, silicon oxide (i.e., silica or glass), titanium oxide, yttrium oxide, zirconium oxide, iron oxide, zinc oxide, aluminum oxide, gallium oxide, indium oxide, tin oxide, magnesium oxide, or cerium oxide, or combination thereof. The filler material, if present, is generally present in the polyester composite in an amount of 0.05-20 wt % (by weight of the polyester composite). In different embodiments, the filler material is present in the polyester composite in an amount of 0.1, 0.2, 0.5, 0.8, 1, 1.5, 2, 2.5, 3, 3.5, 4, 4.5, 5, 6, 7, 8, 9, 10, 12, 15, 18, 20, 25, 30, 35, 40, 45, or 50 wt %, or in an amount within a range bounded by any two of the foregoing values (e.g., 0.1-50 wt %, 0.1-20 wt %, 0.1-10 wt %, 0.1-5 wt %, 0.1-1 wt %, 1-50 wt %, 1-20 wt %, 1-10 wt %, or 1-5 wt %).

The polyester composite described herein is a solid material with an appreciable degree of tensile strength, tensile strain (elongation-to-break), and Young's modulus (elastic modulus). In a first set of embodiments, the polyester composite has a tensile strength of at least or greater than 50, 55, 60, 65, 70, or 75 MPa, or a tensile strength within a range bounded by any two of the foregoing values. In a second set of embodiments, the polyester composite has a tensile strain of at least or greater than 10, 15, 20, 25, 30, 40, 50, 60, 70, 80, 90, 100, 110, 120, 130, 140, or 150%, or a tensile strain within a range bounded by any two of the foregoing values. In a third set of embodiments, the polyester composite has a Young's modulus of at least or greater than 1, 1.1, 1.2, 1.3, 1.4, 1.5, 1.6, 1.7, 1.8, 1.9, or 2 GPa, or a Young's modulus within a range bounded by any two of the foregoing values. In a fourth set of embodiments, the polyester composite has a storage modulus (E') at 20° C. of at least or greater than 1000, 1200, 1500, 1800, 2000, 2200, 2500, 2800, or 3000 MPa. Some embodiments may also combine any of the physical values listed in the above first, second, third, and fourth embodiments.

In another aspect, the invention is directed to a process for preparing the polyester composites described above. Any method capable of producing a composite containing liquid droplets within a solid matrix are considered herein provided that the method is applicable to a polyester matrix and droplets of a high boiling liquid. In particular embodiments, a polyester is melted and subjected to shearing while the high boiling liquid is introduced and thoroughly dispersed into the polyester by the shearing action. If a modifier is to be included, the modifier can also be added to the polyester under shear, either before, during, or after addition of the high boiling liquid.

Examples have been set forth below for the purpose of illustration and to describe certain specific embodiments of the invention. However, the scope of this invention is not to be in any way limited by the examples set forth herein.

EXAMPLES

Fabrication of Polymer-Droplet Composites (PDCs)

As schematically illustrated in FIG. 1, a very facile and industry-friendly process based on reactive melt-mixing was employed to fabricate the designed polymer-droplet composites (PDCs). The PLA particles were first melted and then reacted with citric acid (CA) at the conditions indicated in FIG. 1. Depending on the chain chemistry (e.g., PLA), the polymer tails/ends then may be modified by small molecules (e.g., CA) at melt state to achieve reinforced targeting behavior. Finally, droplets with appropriate surface chemistry, such as polydimethylsiloxane liquid (l-PDMS), were introduced into the modified polymer melt. Similar to a process of targeted drug delivery, the droplets can collect and group chain ends/tails from different chains, forming a small "pool" coupling different chains inside the PDCs. These unique interactions between the droplets and modified polymer chain can result in significant changes to the structures and properties of the topological network of polymer chains.

Figure 2:
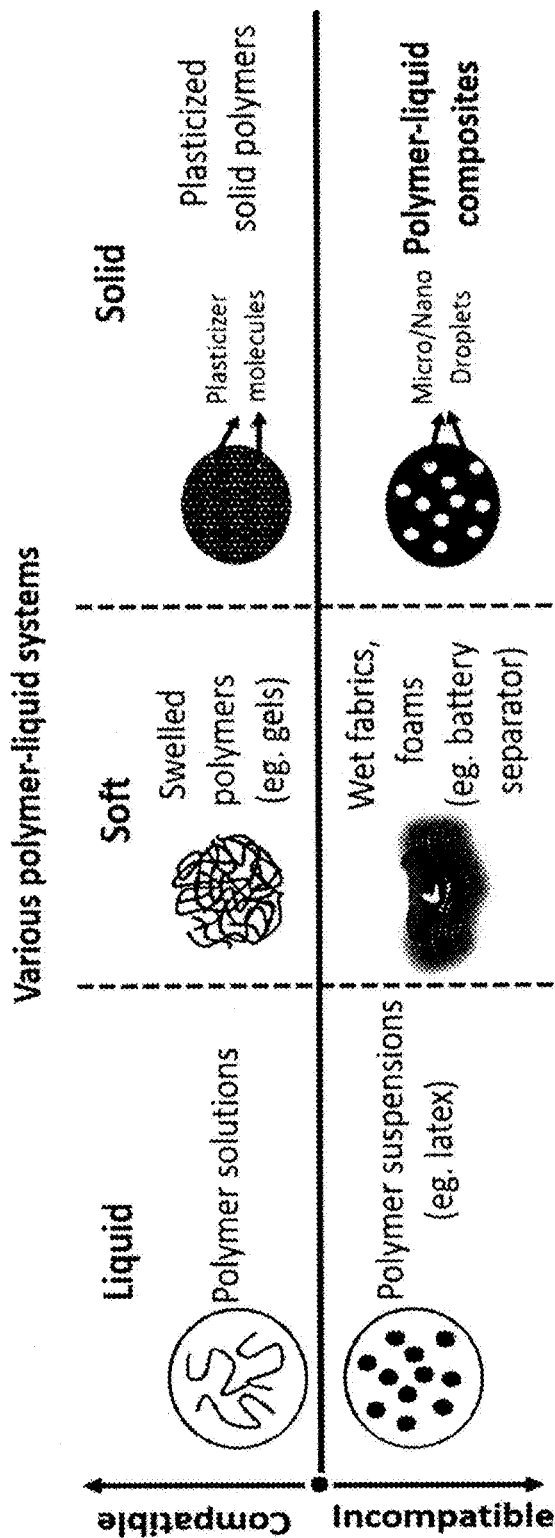
FIG. 2 is a chart classifying various polymer-liquid systems, including solutions, gels, or plasticized solids, depending on the compatibility between polymer and liquid.

Interestingly, PDCs represent a special solid material composed of incompatible polymers and liquids. As shown in FIG. 2, PDCs can take various forms, such as solutions, gels, or plasticized solids, depending on the compatibility between polymer and liquid. PDCs may also form suspensions, wet foams, or fabrics, which have found significant applications in oil-water separation, coatings, and energy storage devices. Traditional studies of polymer-liquid composites have concentrated on embedding liquid lines (typically, conductive liquid metal) into stretchable polymers. Consequently, scientific and technical studies of PDC with liquid droplets are new and have seldom been reported (P. Dong et al., *ACS Applied Materials & Surfaces*, 8(3), pp. 2142-2147, 2016).

Analysis of PDCs

The structures of PDCs with droplets as the dispersed phase are very similar to emulsion. To simplify the structures and remove the effects of polymer crystallization on their mechanical properties, the melts of the composites were cooled with a fast speed (~60° C./min) to prevent crystallization. As a result, pure PLA, or "lemonized" PLA, became an amorphous and transparent solid glass, as also confirmed by ultraviolet-visible (UV-Vis) spectroscopy. With the addition of liquids with a high boiling point (i.e., higher than the melting point of PLA, ~160° C.), the liquids automatically form well-dispersed droplets aided by melt-shearing due to their incompatibility.

Figure 3:
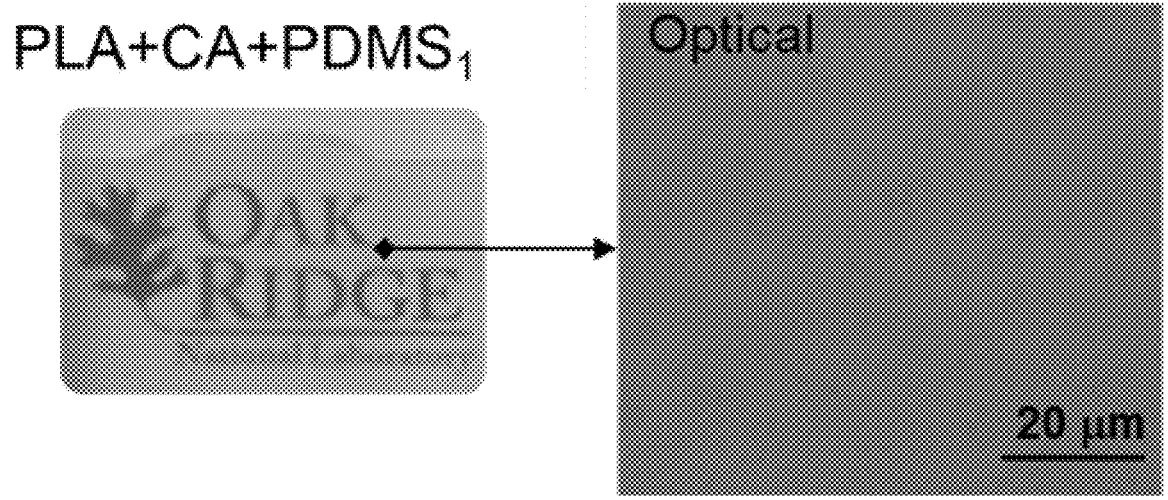
FIG. 3 is a picture of a PDC (left) and optical microscopy image of the PDC (right), wherein the PDC is PLA+CA+ PDMS$_1$.
Figure 4:
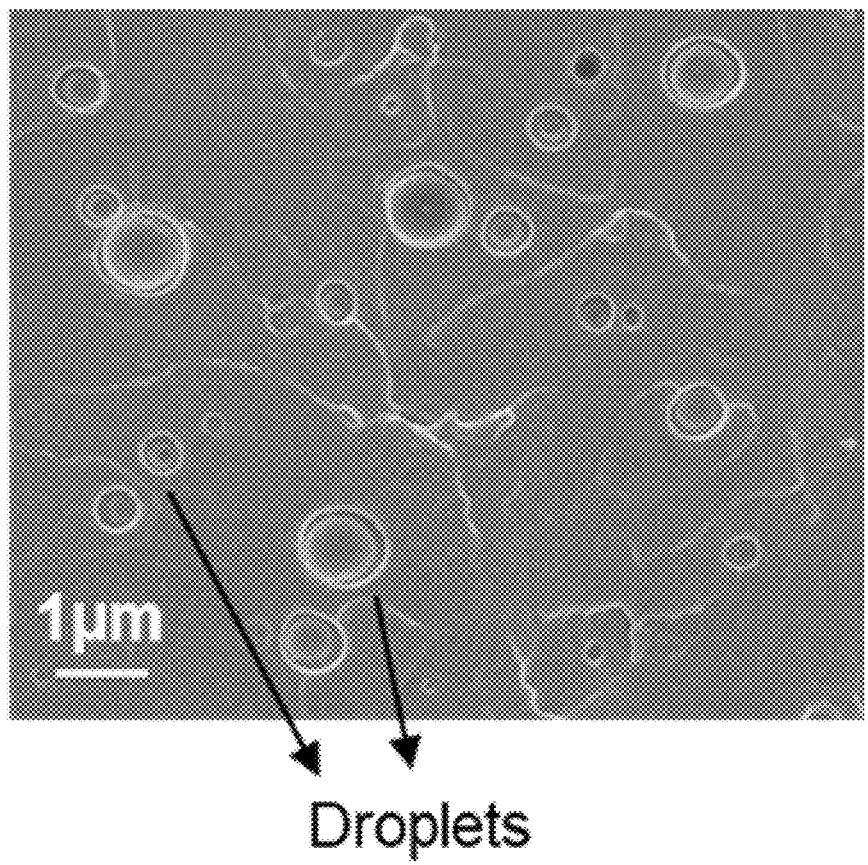
FIG. 4 is a scanning electron microscopy (SEM) image of PLA-CA/l-PDMS-OH, also referred to herein as PLA+CA+ PDMS$_2$.
Figure 5:
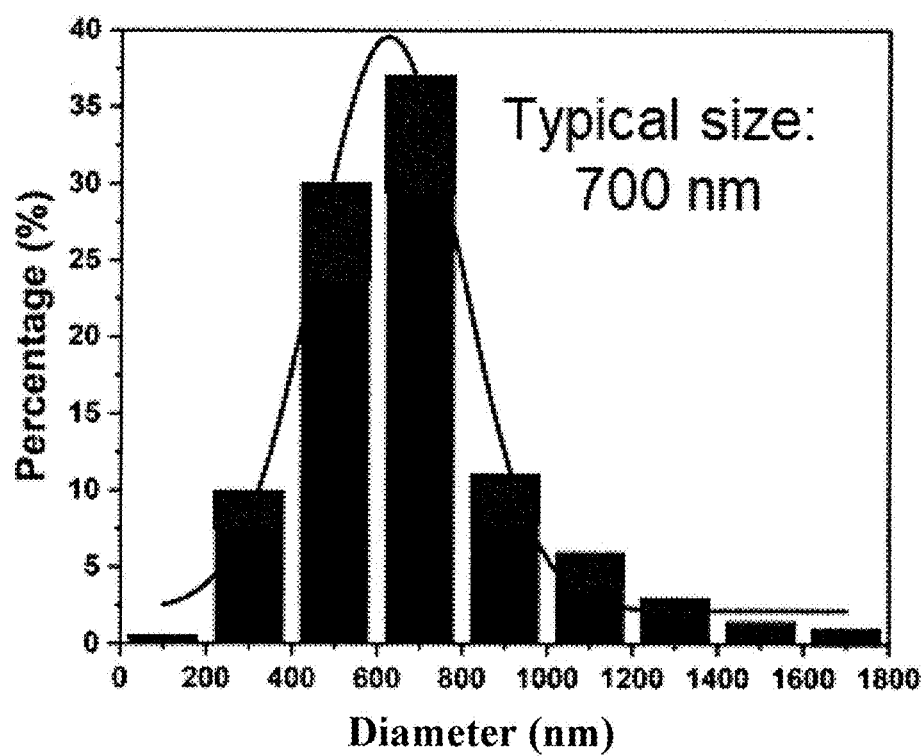
FIG. 5 is a size distribution chart of the PLA+CA+PDMS$_1$ PDC.
Figure 6:
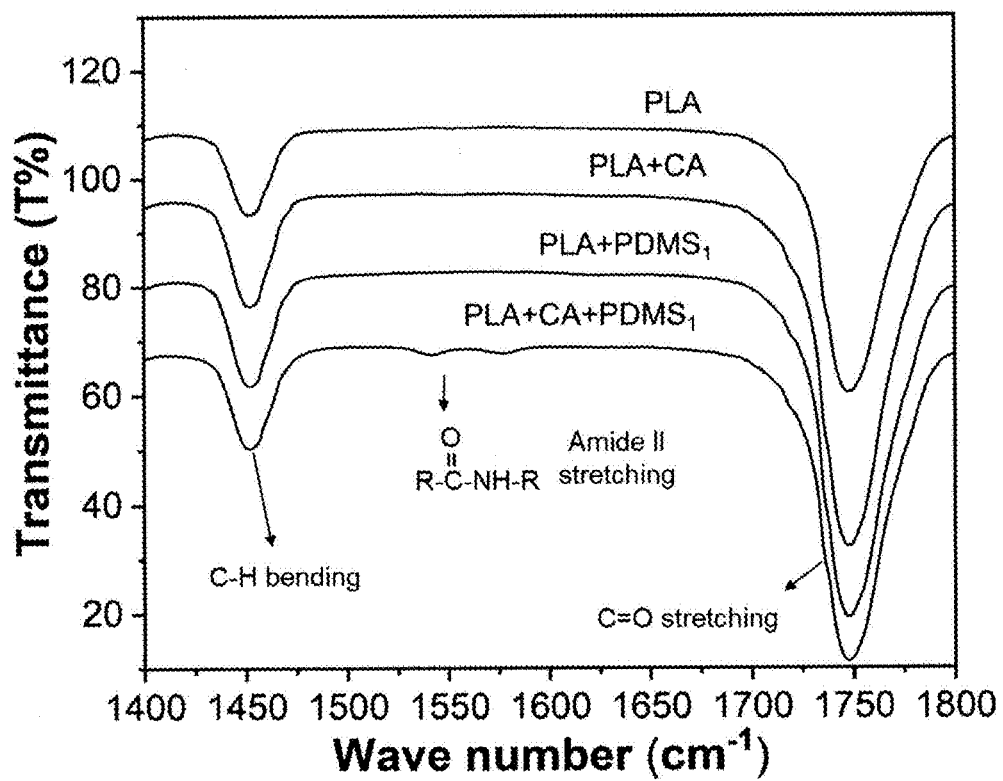
FIG. 6 is a Fourier-transform infrared spectroscopy spectrum for the PDCs with different compositions based on PDMS$_1$ droplets.

This experiment investigated PDMS with different end groups (i.e., $PDMS_1$, $PDMS_2$, and $PDMS_3$, containing —$NH_2$, —OH, and —$CH_3$ terminal groups, respectively) but with similar viscosities. As shown by the optical micrograph in FIG. 3 (right) and the SEM micrograph in FIG. 4, PDMS formed small droplets with a typical size of 500-700 nm inside the PLA matrix, depending slightly on the end groups of the PDMS molecules. The size distribution is shown in the bar chart in FIG. 5. The possible interactions and reactions among PLA, CA, and PDMS droplets were further investigated by Fourier-transform infrared spectroscopy (FTIR). The FTIR spectra show no difference between PLA and lemonized PLA (i.e., PLA+CA), probably because the reaction between CA and PLA does not generate new chemical bonds as compared with PLA. At the same time, scanning electron microscopy (SEM) images of the fracture surface for lemonized PLA show very smooth morphology without CA nanoparticles, which is very similar to the result for pure PLA, and this indicates that CA has been absorbed by the PLA matrix. Although it is very challenging to directly prove the reaction between the PLA chain end/tail and CA, the presence of the $PDMS-NH_2$ droplet permits detection of the reaction between the droplet and lemonized PLA, as shown in the FTIR scans in FIG. 6. The detection of amide-II bond (HN—C=O) in the PLA+CA+$PDMS_1$ sample indicates only that CA plays a critical role in chemically connecting the PLA chain with the PDMS droplets, which is also evidenced by the light orange color of the PLA+CA+$PDMS_1$ sample. However, it should be noted that chemical bonding is not the only interaction taking place between the droplet and PLA+CA. Other strong interactions, such as hydrogen bonding, may also play a critical role in coupling PLA chain ends/tails with the droplets, as discussed below.

Rheology is very sensitive to the topological entanglement structures of polymer melts. This makes rheology a very powerful framework for investigating how CA and PDMS droplets together affect the topological entanglement structures of PDCs. First, the proposed two-phase droplet-in-melt emulsion structure is evidenced by the plateau area of storage moduli at low-frequency range, as shown in the storage modulus vs. frequency plot shown in FIG. 7A. Meanwhile, the plateau area also indicates an additional network structure built by the dispersed droplets (H. Goldansaz et al., *Macromolecules*, 48(10), pp. 3368-3375, 2015; C. Galindo-Gonzalez et al., *Macromolecules*, 47(9), pp. 3136-3144, 2014). More significantly, the storage modulus and viscosity for PLA+CA+$PDMS_1$ is dramatically reduced when compared with all its counterparts (i.e., PLA, PLA+CA, PLA+$PDMS_1$) (FIG. 7A). The storage modulus is much lower than another control sample of PLA-CA plasticized by its solvent, propylene carbonate (referred to as PC-plasticizer). Similar behavior has also herein been found for another two types of PDCs composed of $PDMS_2$ and $PDMS_3$ droplets. This result reveals an unknown but very meaningful plasticizing phenomenon contributed by a synergistic effect between PDMS droplets and lemonized PLA.

Figure 8:
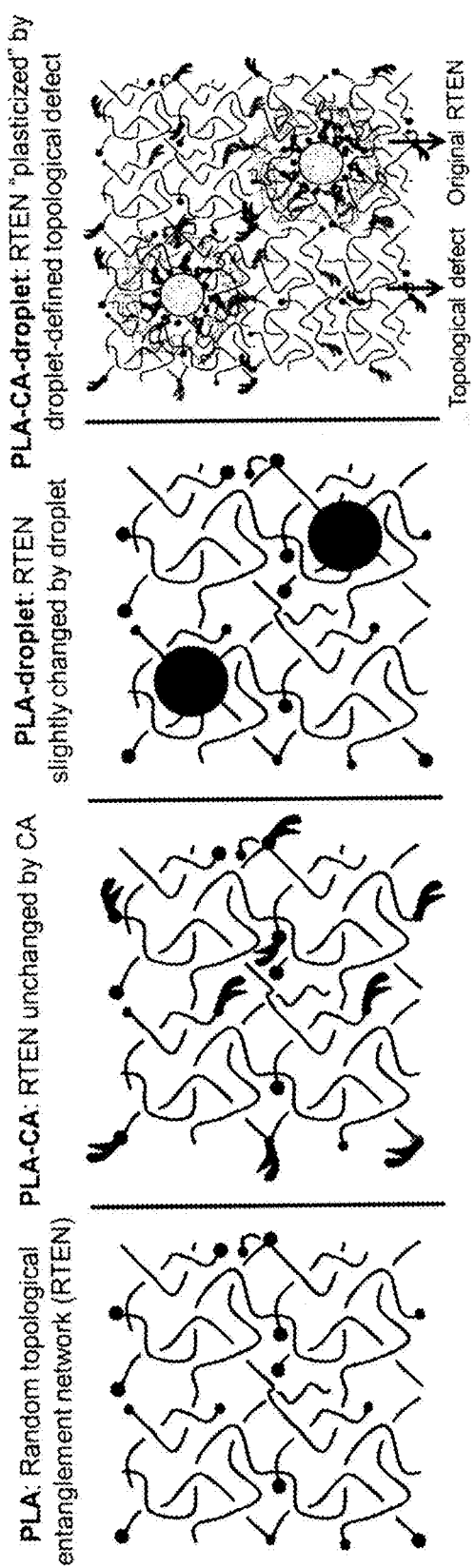
FIG. 8 graphically depicts topological plasticizing effects arising from the synergy of the droplets and lemonized PLA in a PLA+CA+PDMS$_1$ PDC.

To explain this unusual melt rheological behavior, a new concept of topological plasticizing effects is herein provided, as illustrated in FIG. 7B. Based on the microstructures and possible interactions among the components, the random topological entanglement network (RTEN) structures of PLA melt must be changed very subtly, requiring the teamwork of CA and a PDMS droplet. In other words, the addition of only one of them will not change the RTEN structures of PLA melt very significantly because rheological properties of the PLA+CA and PLA+PDMS melts almost overlay that of the pure PLA melt. A likely way the CA and PDMS droplet can work together to bring about supertoughness is illustrated in FIG. 8. Specifically, CA acts as a chain end/tail modifier via a melt reaction with PLA, generating lemonized PLA with targeting behavior, as illustrated in FIG. 1. Consequently, when PDMS droplets are introduced, the lemonized PLA chains with CA-modified ends/tails will stick to the PDMS droplet surface and be softly coupled by the droplets. As a result, the droplets are unable to diffuse as they do in traditional melt, which makes a big difference in topological entanglement structures near the droplet. At the same time, the droplet also generates a weak space free of chain entanglement, which is proposed here as a topological defect for the entire entanglement network. These droplet-defined topological defects notably reduce the storage modulus and viscosity (FIGS. 7A and 7B) and fundamentally change the mechanical properties of the resultant PDCs, which will be introduced below.

Figure 9:
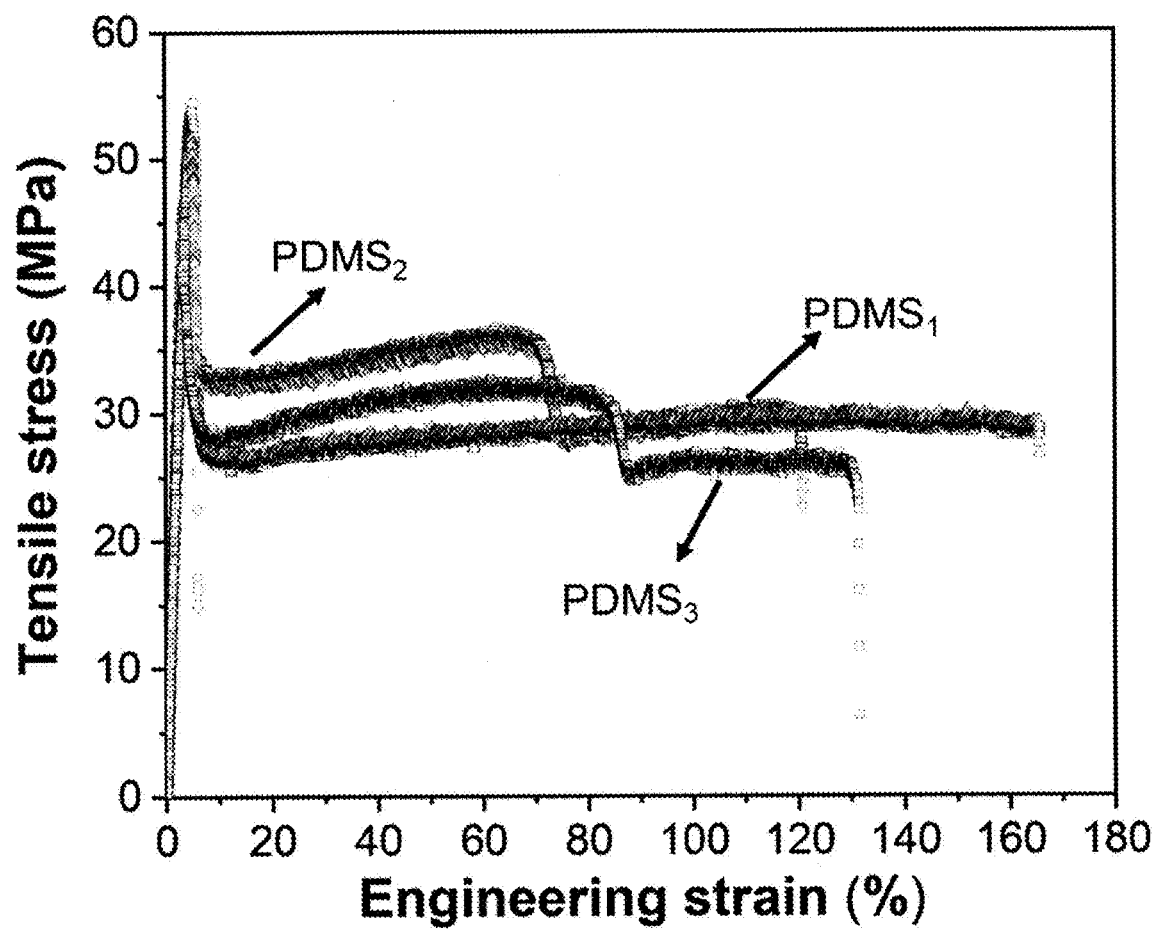
FIG. 9 shows stress-strain curves for the PLA+CA+ PDMS PDCs with different droplet chemistry. Herein, PLA+ CA+PDMS$_3$ refers to PLA-CA/l-PDMS-CH$_3$.
Figure 10:
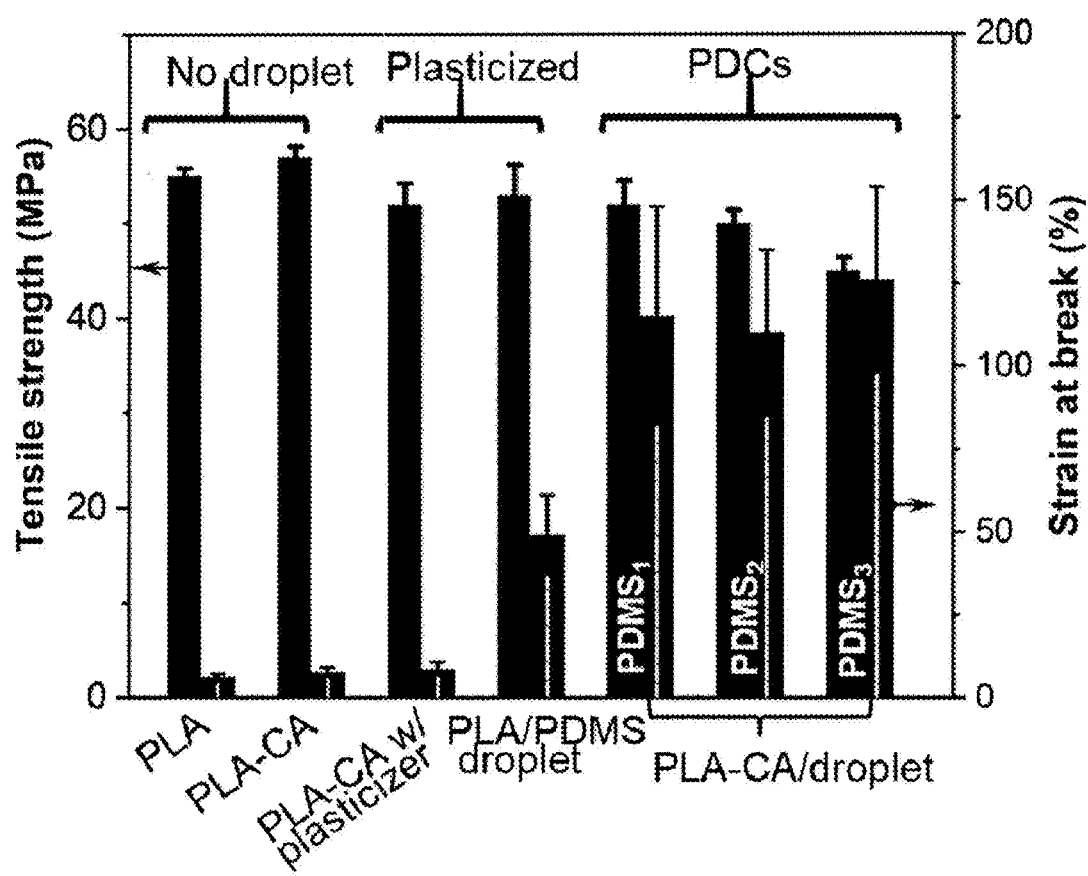
FIG. 10 is a bar chart comparing tensile strength and strain at break for the PLA+CA+PDMS$_1$ PDCs.

The mechanical properties of PDCs were investigated by tensile testing. It is well known that PLA is a very brittle bioplastic, which has been one of the primary limiting factors impeding its broad application. The strain at break is only ~6%, even when tested with a very low rate of 1.5 mm/min at room temperature, as shown in the stress-strain curves for the PLA+CA+PDMS composites in FIG. 9. The addition of CA into PLA only slightly changes PLA's mechanical properties, as shown in the plot of tensile strength and strain at break for the PLA+CA+PDMS composites in FIG. 10. Surprisingly, the PLA+CA+PDMS samples with 1 wt % of PDMS droplets as topological modifier showed a strain at break above 100% (FIG. 9). Specifically, the $PDMS_1$ droplet gives rise to the highest strain of 160±43% at break, while the mechanical strength is maintained as compared with neat PLA, as shown in FIG. 10. PDMS droplets with other end groups are also effective in boosting the strain while sacrificing a little in mechanical strength (FIG. 10). In comparison, the lemonized PLA further plasticized by high-boiling-point solvent (propylene carbonate) with the same loading of 1 wt %, still shows brittle behavior similar to neat PLA and lemonized PLA (FIG. 10). It is noted that the PDCs without CA also show notably improved strain at break (40-70%), but the overall toughness is much lower than that of PLA+CA+PDMS samples (FIG. 10).

Figure 11:
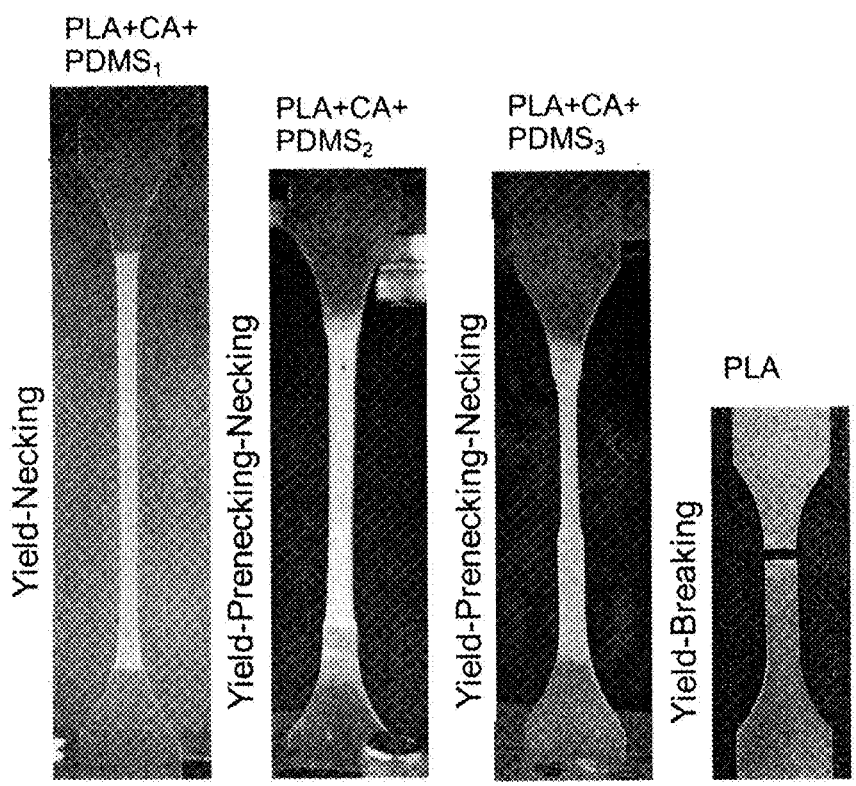
FIG. 11 presents digital photos showing the typical stretching behavior for the PLA/l-PDMS composites as compared with pure PLA.
Figure 12:
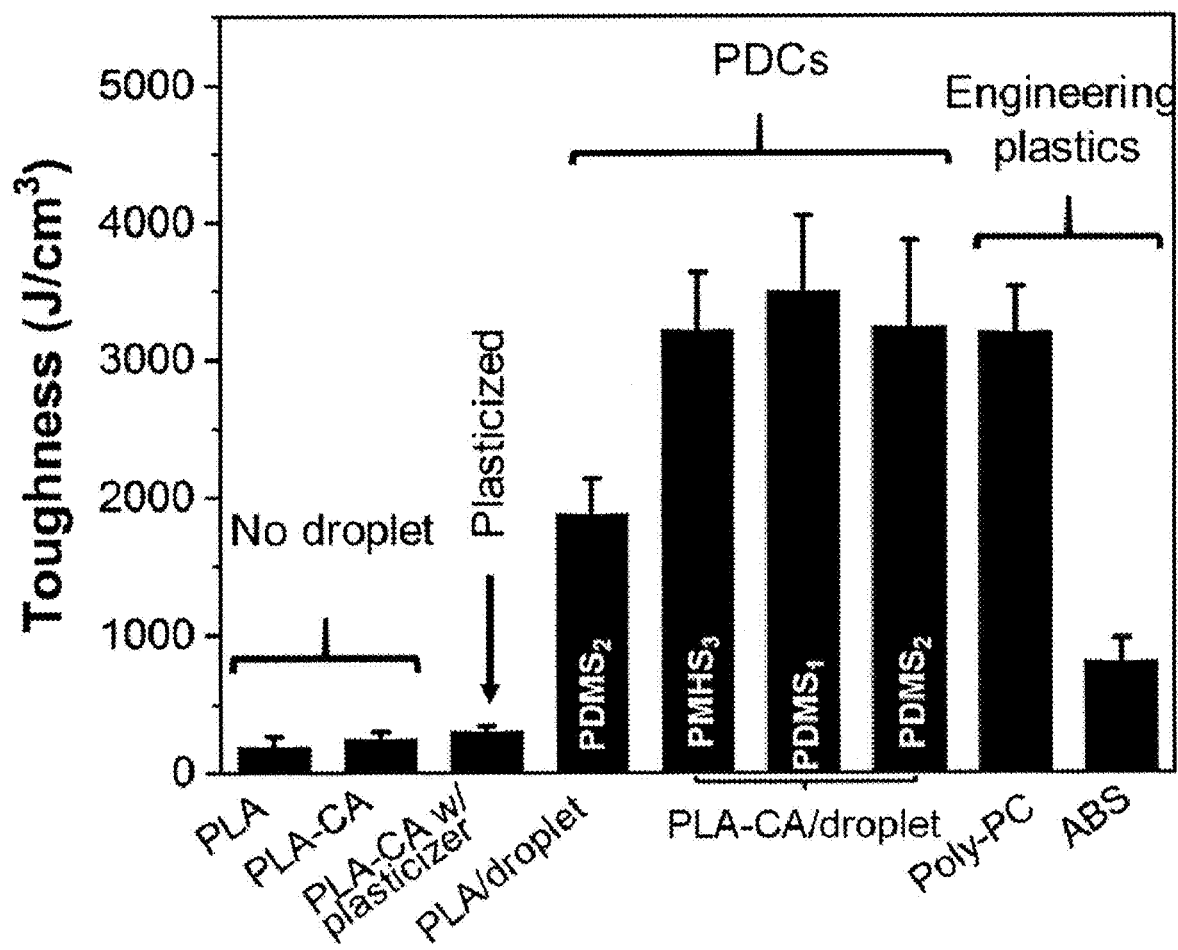
FIG. 12 is a bar chart comparing toughness for the PLA+CA+PDMS$_1$ PDCs with conventional polymers and their counterparts. All the samples were tested at room temperature with a stretching speed of 1.5 mm/min.

The tensile behavior of the PDCs of PLA+CA+PDMS depends on the type of PDMS droplet applied, as displayed by the images shown in FIG. 11. In particular, the PLA+CA+$PDMS_1$ composite exhibited necking behavior immediately after yielding, which generates only one plateau in the stress-strain curve (FIG. 9). In contrast, the composites of PLA+CA+$PDMS_2$ and PLA+CA+$PDMS_3$ experienced yielding, pre-necking, and necking processes, which generated two plateau areas in the stress-strain curve (FIG. 9). From the images, one can clearly observe a change from semi-transparent to white during necking or pre-necking, due to the formation of numerous pores inside the composites, which ultimately generated a notable volume increase by ~15% after tensile testing. As a result, the brittle PLA was successfully transformed into a supertough plastic, as indicated by the toughness chart shown in FIG. 12. As particularly shown in FIG. 12, the toughness is improved from 230±43 to 4,023±710 $J/cm^3$, which corresponds to an increase of 2,000%. The foregoing result is significant considering that the PDCs contain only 0.5 wt % of CA and 1 wt % of droplets. The toughness of PLA+CA+$PDMS_1$ composite is much higher than conventional engineering plastics, such as polycarbonate (i.e., poly-PC) and acrylonitrile-butadiene-styrene (ABS) (FIG. 12).

Figure 13:
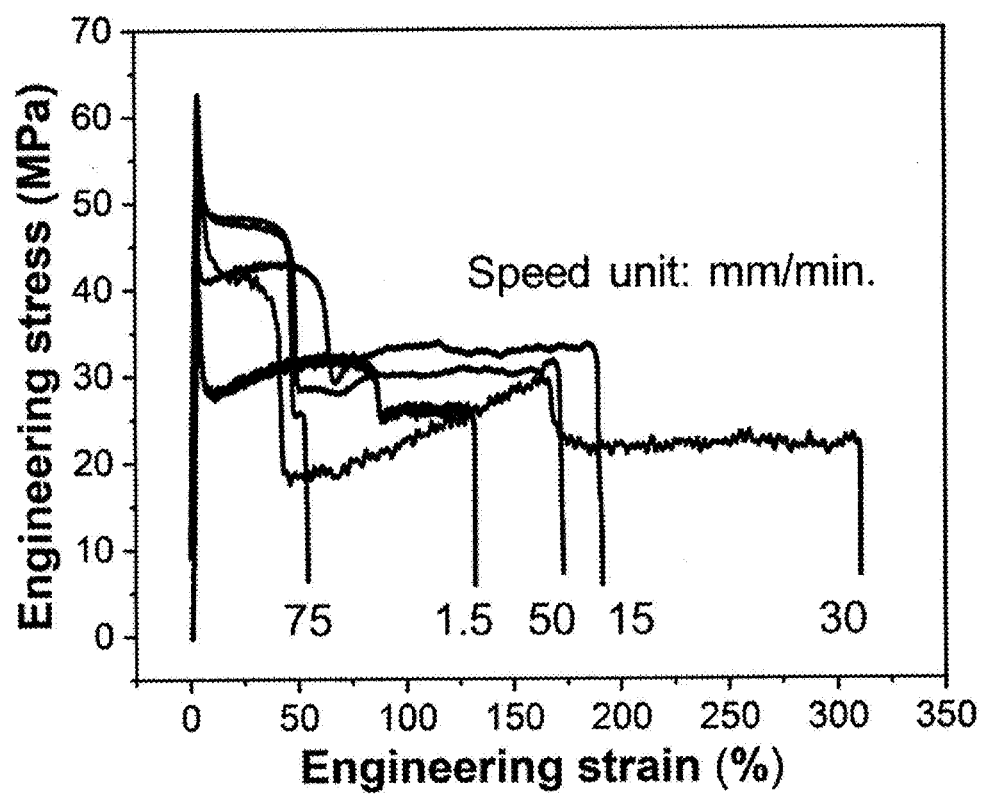
FIG. 13 is a tensile stress vs. strain plot showing unusual stress-strain behavior for the PLA+CA+PDMS$_3$ PDC tested with stretching speeds of 1.5-75 mm/min.
Figure 14:
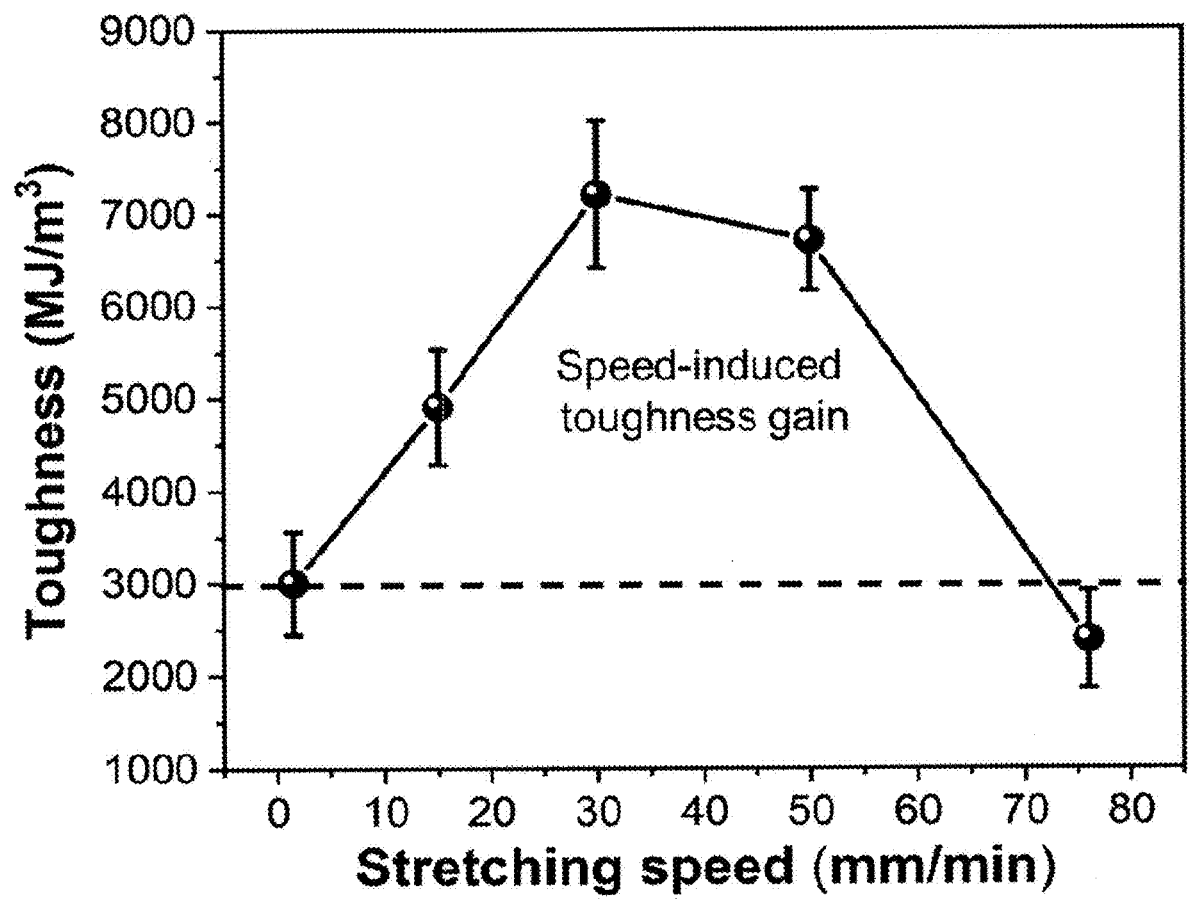
FIG. 14 is a toughness vs. stretching speed plot showing shock-induced gain of the PLA+CA+PDMS$_3$ PDC.

The unusual toughness of the PDCs is further demonstrated by unexpected gains in speed-enhanced toughness and shock-induced toughness, as shown in the tensile stress vs. strain plot in FIG. 13 and toughness vs. stretching speed plot in FIG. 14. The strain at break for the PLA+CA+$PDMS_3$ composite increases remarkably with increasing stretching speed until it reaches 50 mm/min. The strain at break can even exceed 300% at a high tensile testing speed of 30-50 mm/min. Benefiting from this unique stretching behavior, the supertoughness of the PLA+CA+PDMS composite is further boosted from ~3,000 to 7,000 $MJ/m^3$ by increasing the stretching speed from 1.5 to 30 mm/min (FIG. 14). The PDCs are still very tough at a high stretching speed of 75 mm/min. This is counterintuitive and unexpected, as materials tend to be more brittle under faster deformation. This unique supertough behavior of PDCs may find significant applications in mechanical energy absorption and dissipation technologies.

Discussion

The effects of liquids on the mechanical properties of polymers are well recognized by conventional plasticizing theories (E. H. Immergut et al., Advances in Chemistry, 48, pp. 1-2, 1965). Liquid molecules are viewed as external plasticizers that can diffuse into the polymers via solvation or swelling, improving the chain mobility and flexibility and, therefore, toughness. However, plasticizing theory is not applicable to the PDCs examined in this work for two reasons. First, the liquid in the PDCs exists as a second phase of small droplets, instead of diffusing into the polymers, and second, conventional plasticizing effects have been excluded by the rheological and mechanical properties of control sample PLA-CA with PC-solvent as the plasticizer (FIGS. 7A, 10, and 12). Furthermore, because the droplets can be viewed as a type of very soft filler, the structures and properties of another control sample, PLA-CA with soft elastomer thermoplastic polyurethane (TPU) particles as the dispersed phase, were also herein studied. Interestingly, the strain at break for this control sample ranges from 30 to 60%, which is much higher than pure PLA (6%) but still significantly lower than that of the PDCs based on PLA+CA+PDMS (>100%). These facts indicate that conventional plasticizing effects and rubber toughening mechanisms all fail to explain PDCs' unusual supertoughness, which are better explained by a unique toughening mechanism controlled by the reshaped topological structures as introduced in FIG. 8.

Figure 15:
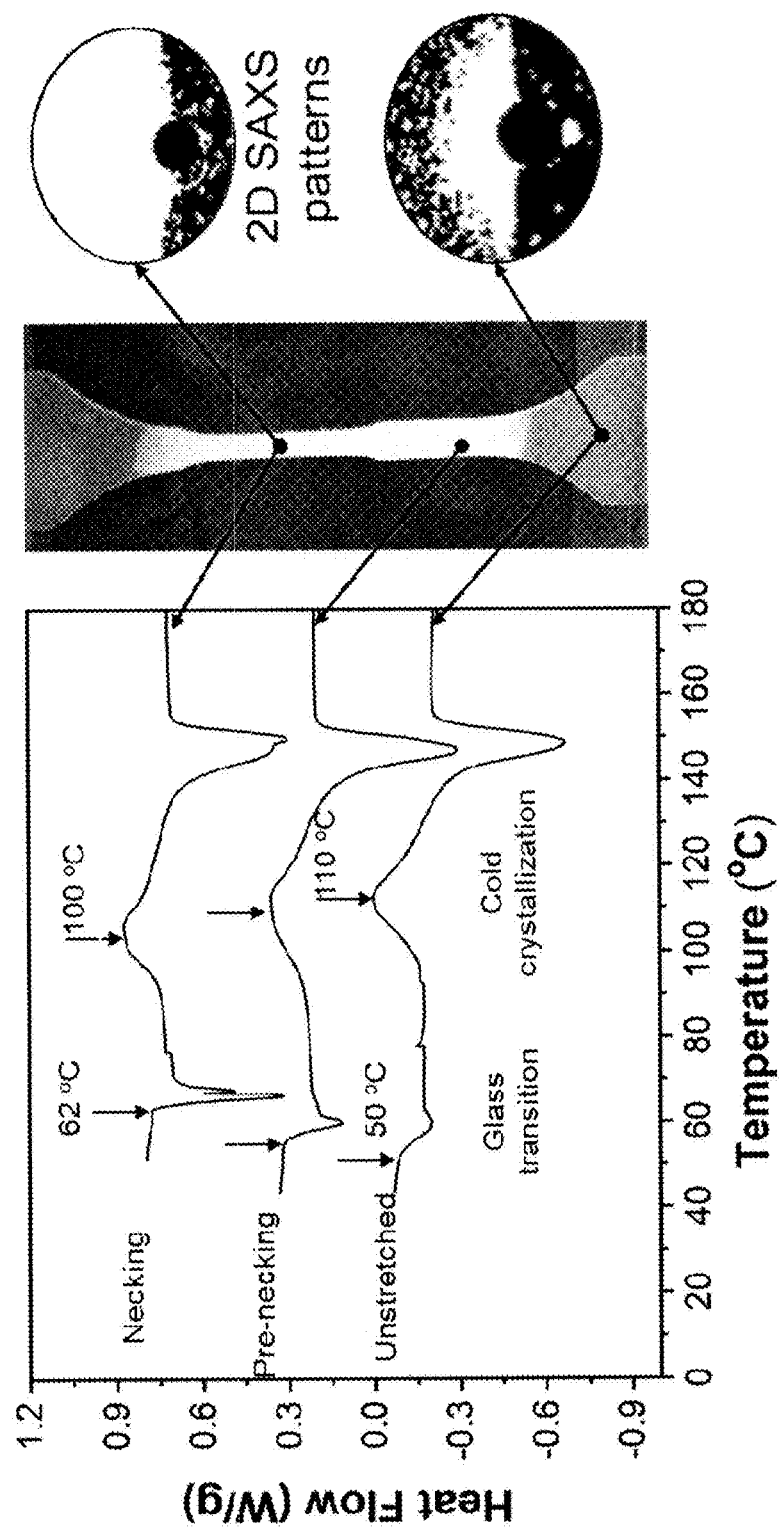
FIG. 15 shows heat flow vs. temperature (differential scanning calorimetry) plots and accompanying 2D SAXS patterns of the stretched PLA+CA+PDMS$_3$ PDC.
Figure 16:
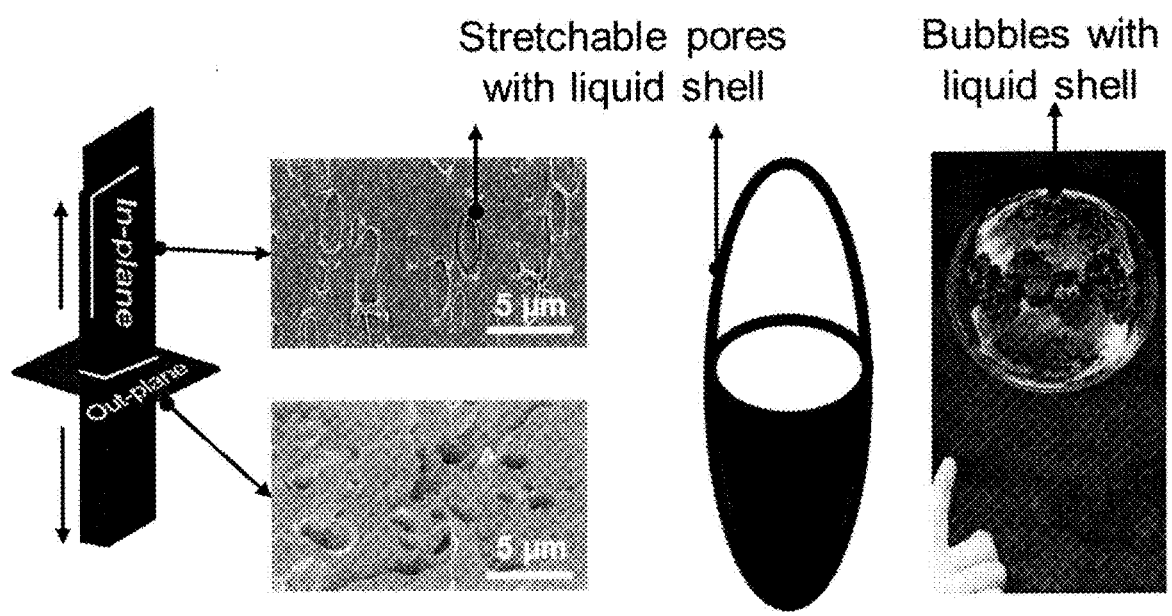
FIG. 16 shows SEM images (left, top and bottom images) of the fracture surfaces at the necking area viewed from different angles, a graphical representation of the stretchable pores (middle image), and a digital photo showing a bubble with a liquid shell (rightmost image).

To identify a new toughening mechanism, ex situ studies were conducted to investigate the PDCs' morphological structure evolution at locations corresponding to three stages of deformation, including the initial stage (i.e., unstretched); the pre-necking stage, and necking stage. As shown in the heat flow vs. temperature plots and accompanying 2D SAXS patterns in FIG. 15, the glass transition temperature, $T_g$, of PLA significantly changes with the deformation stage. It increased by 12° C. after the sample was stretched into the necking stage. This notable shift of $T_g$ to a higher temperature caused by stretching indicates that the interactions among chains are strengthened, likely due to chain stretching and orientation, as confirmed by the 2D small-angle x-ray scattering (2D SAXS) pattern in FIG. 15. At the same time, the cold crystallization temperature shifts from 110 to 100° C. after necking. This is consistent with the glass transition behavior discussed above. A deep analysis of the 2D SAXS pattern reveals stretching-induced microcrystal structures with a lamella distance of 30.6 nm. Similar phenomena were also observed for PLA+CA+$PDMS_1$ and PLA+CA+$PDMS_2$. SEM images (left, top and bottom images) of the necking area viewed from two perpendicular directions, as indicated in FIG. 16, further revealed the formation and stretching of pores induced by the droplets.

Figure 17:
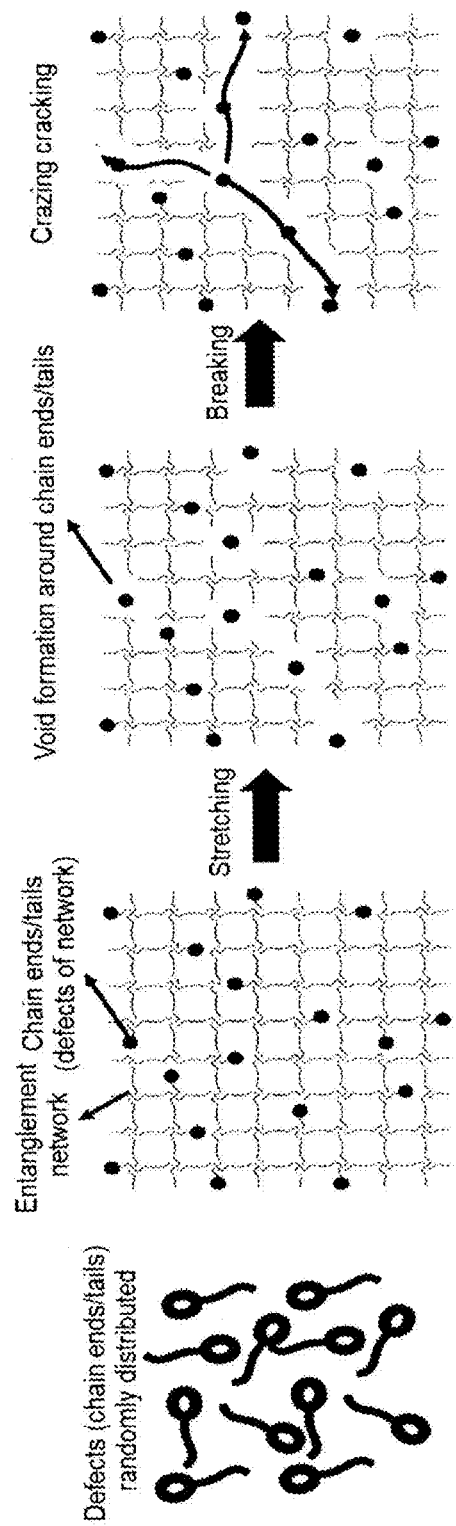
FIG. 17 is a schematic of the stretching and fracturing mechanism for brittle amorphous PLA with random entanglement network defects generated by chain ends/tails or processing.

Based on an understanding of structures and their behavior during stretching, a topological super-toughening mechanism is herein proposed to explain the unusual toughness of PDCs. Before the introduction of this new mechanism, the brittleness of unmodified PLA was explained by a defect-controlled crazing cracking model, as provided in the scheme shown in FIG. 17. In this case, the primary defects include voids/pores at a different scale from processing and entanglement discontinuity associated with chain ends/tails and so on. In general, these defects are randomly distributed inside the material and respond to applied load first in an uncontrollable collective way, finally leading to crazing cracking behavior and brittleness.

Figure 18:
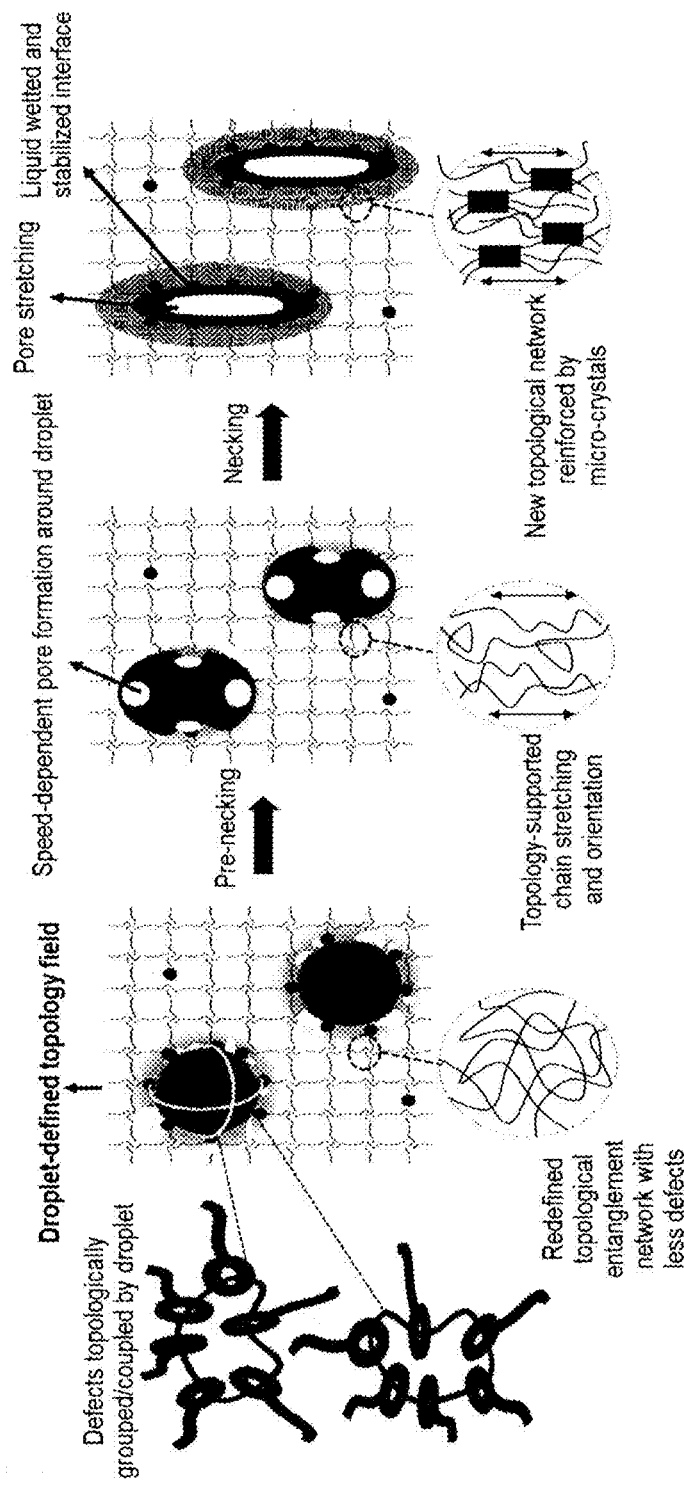
FIG. 18 is a schematic of a hierarchical topological toughening mechanism for PDCs. In this mechanism the droplets coupling chain ends/tails generate a topological defect network that can respond very quickly to applied loads.

In contrast, for the PDCs based on PLA+CA+PDMS, the lemonized PLA chains are grouped or coupled by the droplets through chain ends/tails as illustrated in the scheme shown in FIG. 18. This soft coupling between the chains and droplets results in significant changes to the topological structures of the polymers near the droplets. First, the droplets group the entanglement defects from chain ends/tails into big topological defects, like a soft ball. Second, the topological network of entanglement near the droplet is reconstructed with less entanglement defects. Consequently, the droplets define a unique entanglement-based topology field that is significantly tougher than the traditional topological entanglement network. This droplet-defined topology field plays a critical role in generating unusual mechanical properties, as illustrated in FIG. 18. After yielding, the big topological defect will respond first to the applied load. Specifically, instead of inducing uncontrollable cracks, these topological defects induce the formation of micropores around or inside the droplets. The micropores may unite and grow quickly, whitening and initiating the pre-necking process. The formation of pores around and inside the droplet will consume energy. Here, it is hypothesized that a higher stretching speed or load shock, within a certain range, can help to convert more droplets into micropores. This may explain why the PDCs can generate a much higher strain at break, even at higher stretching speeds (FIGS. 13 and 14).

Of further significance, the stable formation, growth, and stretching of pores is fundamentally enabled by the reconstructed toughened topological network near the droplets. Along with pore stretching in the necking stage, the polymer chains around the droplets are stretched at the same time, forming oriented structures. These stretched and oriented chains will crystallize with further stretching as confirmed by 2D SAXS (FIG. 15), a process called stretch-induced crystallization (T. Yamamoto, *Macromolecules*, 52(4), pp. 1695-1706, 2019; J. Y. Zhao et al., *Macromolecules*, 51(21), pp. 8424-8434, 2018). As a result, a higher level of topological network with microcrystals as physical cross-linking points will grow with stretching, which may further toughen the composites (J. F. Ru et al., *Macromolecules*, 49(10), pp. 3826-3837, 2016). At the same time, the droplet may wet the pore surface and form a liquid coating on the stretched ellipse-shaped pore during necking. The liquid coating may play a critical role in pore stretching without breaking. Therefore, the droplets not only reconstruct the chains' topological structures, but also stabilize the interface between the pores and PLA matrix, both of which are keys to PDCs' supertough behavior.

Summary

The above experiments have successfully demonstrated a new class of topological supertough PDCs based on a facile topological reconstruction strategy requiring subtle interplay between the small droplet and chain ends/tails. It has herein been found that small droplets combined with chain end/tail modification can generate topological defects and reshape the topological entanglement network around the droplets via soft coupling. With the help of PDCs, brittle polymers, such as the PLA demonstrated in this study, can be transformed into non-traditional supertough plastics via the addition of just 1.5 wt % topological modifiers (i.e., CA and PDMS droplets). Meanwhile, the proposed PDCs have been fabricated via a scalable and industry-friendly process based on melt-mixing. A novel topological super-toughening mechanism is herein proposed to explain the PDCs' unique supertough behaviors.

The results of this study have broad implications. Scientifically, the concept of super-toughening by topology reconstruction of materials will significantly gain a further understanding of polymer-filler relationships in polymer composites. At the same time, this concept may open the door for novel soft topological materials based on polymers and their composites. Technically, this work brings a very cost-effective strategy on managing and harnessing the topological entanglement structures of polymers for achieving unique mechanical properties, which has been very challenging in the past. Meanwhile, because the compositions and physicochemical properties of the droplets are customizable, they provide a very flexible and powerful platform for the design and fabrication of new PDCs with unique structures, mechanical properties, and functions.

While there have been shown and described what are at present considered the preferred embodiments of the invention, those skilled in the art may make various changes and modifications which remain within the scope of the invention defined by the appended claims.

What is claimed is:

1. A toughened polyester composite comprising:
(i) a polyester matrix;
(ii) droplets of a high boiling point liquid having a boiling point of at least 140° C. dispersed in said polyester matrix, wherein said high boiling point liquid is present in an amount of 0.1-10 wt % by weight of the toughened polyester composite; and
(iii) a modifier selected from polycarboxylic, polyol, and polyamine compounds, wherein said modifier is present in an amount of 0.1-10 wt % by weight of the toughened polyester composite.

2. The polyester composite of claim 1, wherein said modifier is a polycarboxylic acid.

3. The polyester composite of claim 2, wherein said polycarboxylic acid is citric acid.

4. The polyester composite of claim 1, wherein component (ii) is present in an amount of 0.1-2 wt %.

5. The polyester composite of claim 1, wherein component (iii) is present in an amount of 0.1-2 wt %.

6. The polyester composite of claim 1, wherein component (ii) is present in an amount of 0.5-2 wt %.

7. The polyester composite of claim 1, wherein component (iii) is present in an amount of 0.5-2 wt %.

8. The polyester composite of claim 1, wherein component (ii) is present in an amount of 0.1-1.5 wt %.

9. The polyester composite of claim 1, wherein component (iii) is present in an amount of 0.1-1.5 wt %.

10. The polyester composite of claim 1, wherein said polyester is a polyhydroxyalkanoate having the following structure:

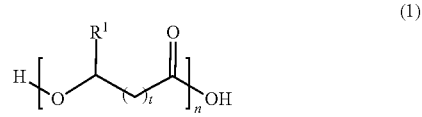

(1)

wherein $R^1$ is selected from a hydrogen atom or hydrocarbon group, t is an integer from 0 to 4, n is an integer of at least 10, and said structure can be a homopolymer or copolymer.

11. The polyester composite of claim 10, wherein said polyhydroxyalkanoate is selected from the group consisting of polylactic acid, polyglycolic acid, poly(3-hydroxypropionic acid), poly(hydroxybutyric acid)s, poly(hydroxyvaleric acid)s, poly(hydroxyhexanoic acid)s, polycaprolactone, polymandelic acid, and copolymers thereof.

12. The polyester composite of claim 10, wherein said polyhydroxyalkanoate comprises polylactic acid.

13. The polyester composite of claim 1, wherein said high boiling point liquid has a boiling point of at least 200° C.

14. The polyester composite of claim 1, wherein said high boiling point liquid is a polysiloxane.

15. The polyester composite of claim 14, wherein said polysiloxane is a polydimethylsiloxane or polymethylhydrosiloxane.

16. The polyester composite of claim 14, wherein said polysiloxane is unfunctionalized.

17. The polyester composite of claim 14, wherein said polysiloxane is functionalized with one or more functional groups selected from the group consisting of hydroxy, amine, carboxylic acid, thiol, diglycidyl ether, acrylamide, vinyl, and halogen groups.

18. The polyester composite of claim 17, wherein said functional groups are located only at terminal positions of the polysiloxane.

19. The polyester composite of claim 14, wherein said polysiloxane is terminal-functionalized with amine groups.

20. The polyester composite of claim 1, wherein said high boiling point liquid is a high boiling plant-derived oil, animal-derived oil, or mineral oil.

21. The polyester composite of claim 1, wherein said droplets have a size of 50 nm to 50 microns.

22. The polyester composite of claim 1, wherein said droplets have a size of 50 nm to 5,000 nm.

23. The polyester composite of claim 22, wherein said droplets have a size of 50 nm to 2,000 nm.

24. The polyester composite of claim 22, wherein said droplets have a size of 50 nm to 1,000 nm.

* * * * *